(12) United States Patent
Kwon et al.

(10) Patent No.: US 10,191,613 B2
(45) Date of Patent: Jan. 29, 2019

(54) METHOD AND APPARATUS FOR DISPLAYING FUNCTION EXECUTION SCREENS

(71) Applicant: Samsung Electronics Co., Ltd., Gyeonggi-do (KR)

(72) Inventors: Younguk Kwon, Gyeonggi-do (KR); Hyungsuk Kim, Gyeonggi-do (KR); Shinjun Lee, Gyeonggi-do (KR); Jungeun Lee, Gyeonggi-do (KR); Sungdae Cho, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 243 days.

(21) Appl. No.: 15/049,202

(22) Filed: Feb. 22, 2016

(65) Prior Publication Data
US 2016/0253072 A1   Sep. 1, 2016

(30) Foreign Application Priority Data
Feb. 27, 2015   (KR) .................. 10-2015-0028658

(51) Int. Cl.
  *G06F 3/00*   (2006.01)
  *G06F 3/0481*   (2013.01)
  *G06F 3/0482*   (2013.01)
  *G06F 9/451*   (2018.01)

(52) U.S. Cl.
  CPC ........ *G06F 3/04817* (2013.01); *G06F 3/0481* (2013.01); *G06F 3/0482* (2013.01); *G06F 9/451* (2018.02); *G06F 2203/04804* (2013.01)

(58) Field of Classification Search
  CPC ............. G06F 3/04817; G06F 3/04842; G06F 3/04883; G06F 3/04886; G06T 11/001
  See application file for complete search history.

(56) References Cited

U.S. PATENT DOCUMENTS

| | | | |
|---|---|---|---|
| 6,215,523 B1 * | 4/2001 | Anderson | H04N 1/00384 348/333.05 |
| 2003/0071850 A1 * | 4/2003 | Geidl | G06F 3/0481 715/781 |
| 2015/0123993 A1 * | 5/2015 | Ohba | G09G 5/00 345/629 |

FOREIGN PATENT DOCUMENTS

KR   10-2014-0123623 A   10/2014

* cited by examiner

*Primary Examiner* — Thanh T Vu
(74) *Attorney, Agent, or Firm* — Cha & Reiter, LLC.

(57) ABSTRACT

A method of an electronic device is provided. The method comprising: displaying a first function execution screen corresponding to a first function; loading a second function; generating a layer that is at least partially transparent onto the first function execution screen; generating a second function execution screen corresponding to the second function; and displaying the second function execution screen on the layer.

18 Claims, 21 Drawing Sheets

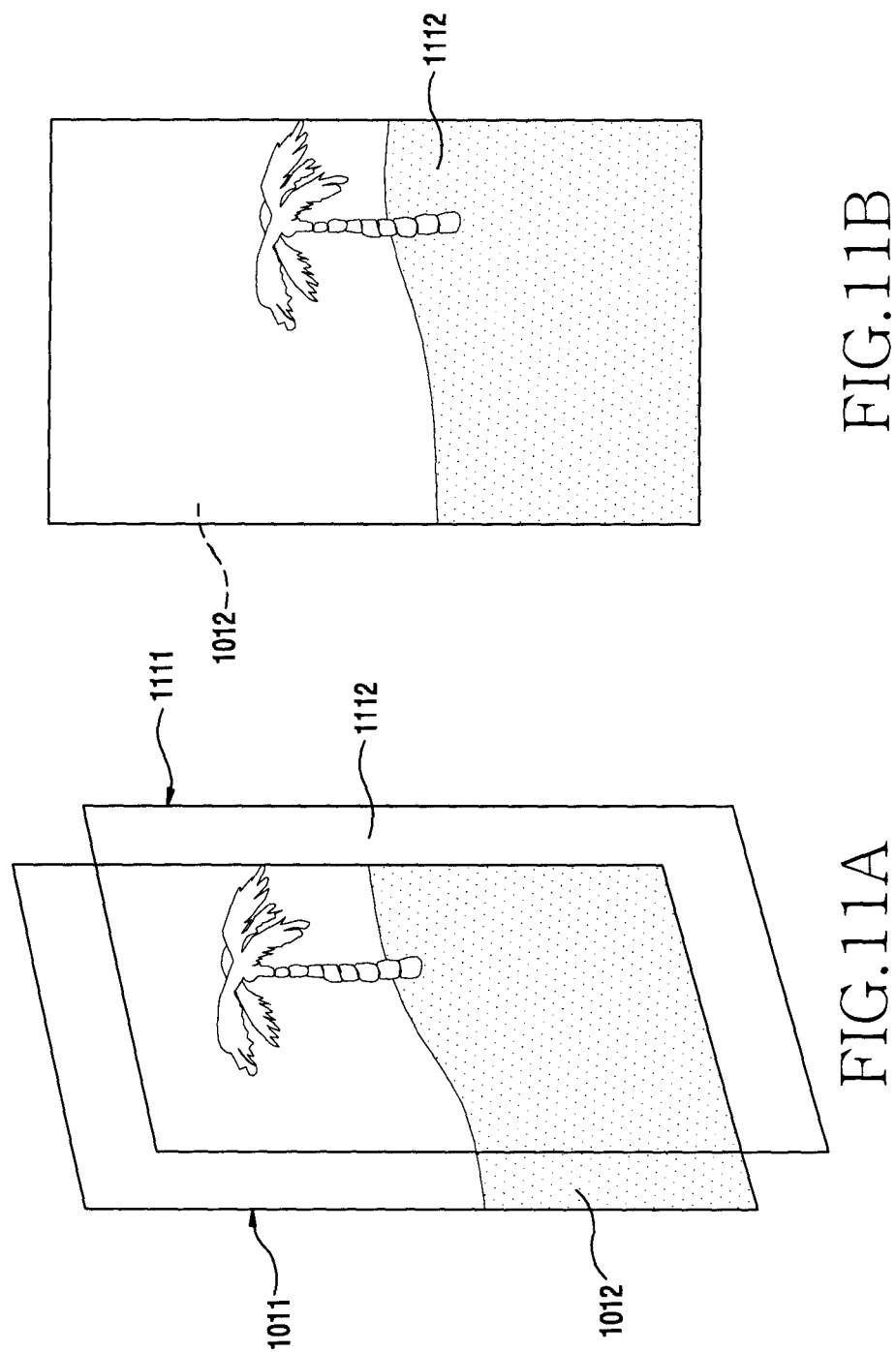

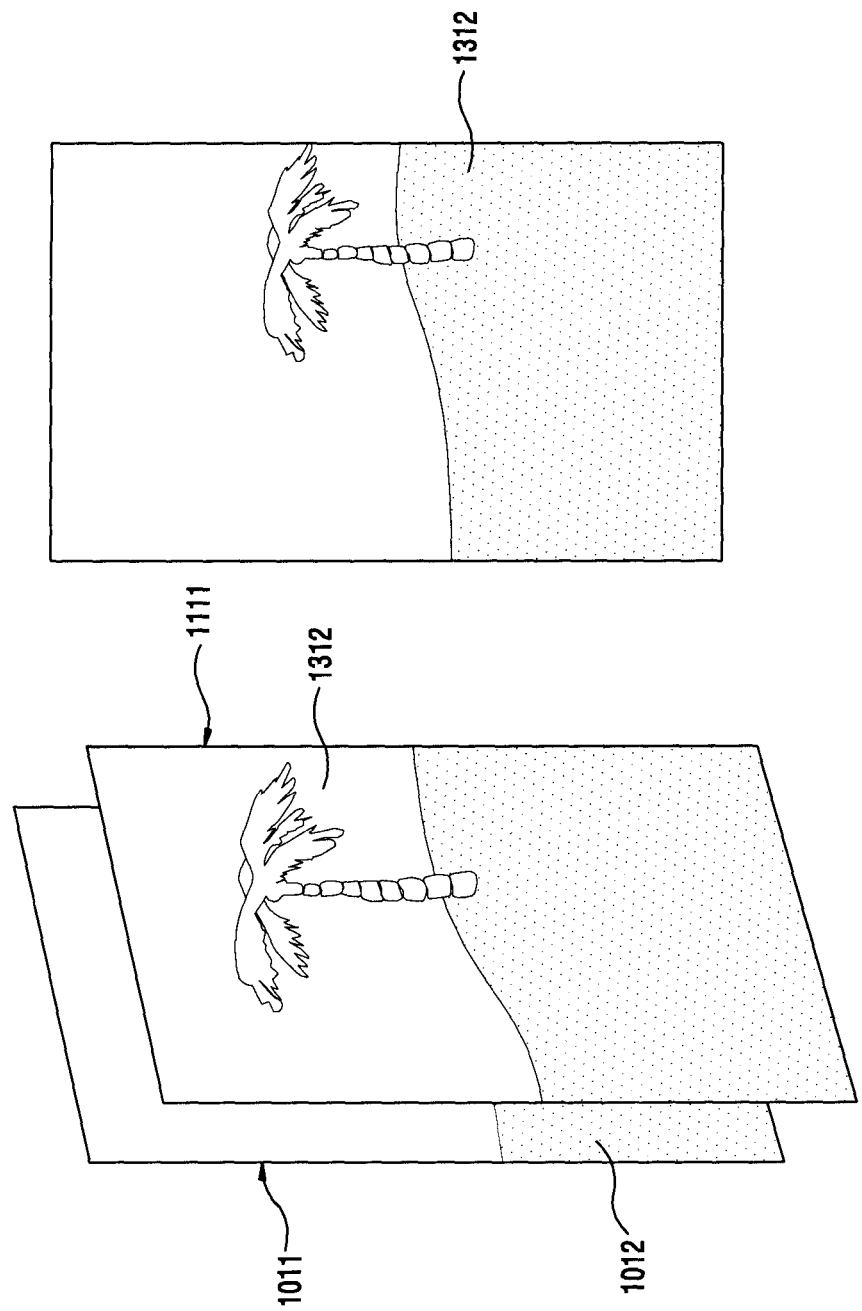

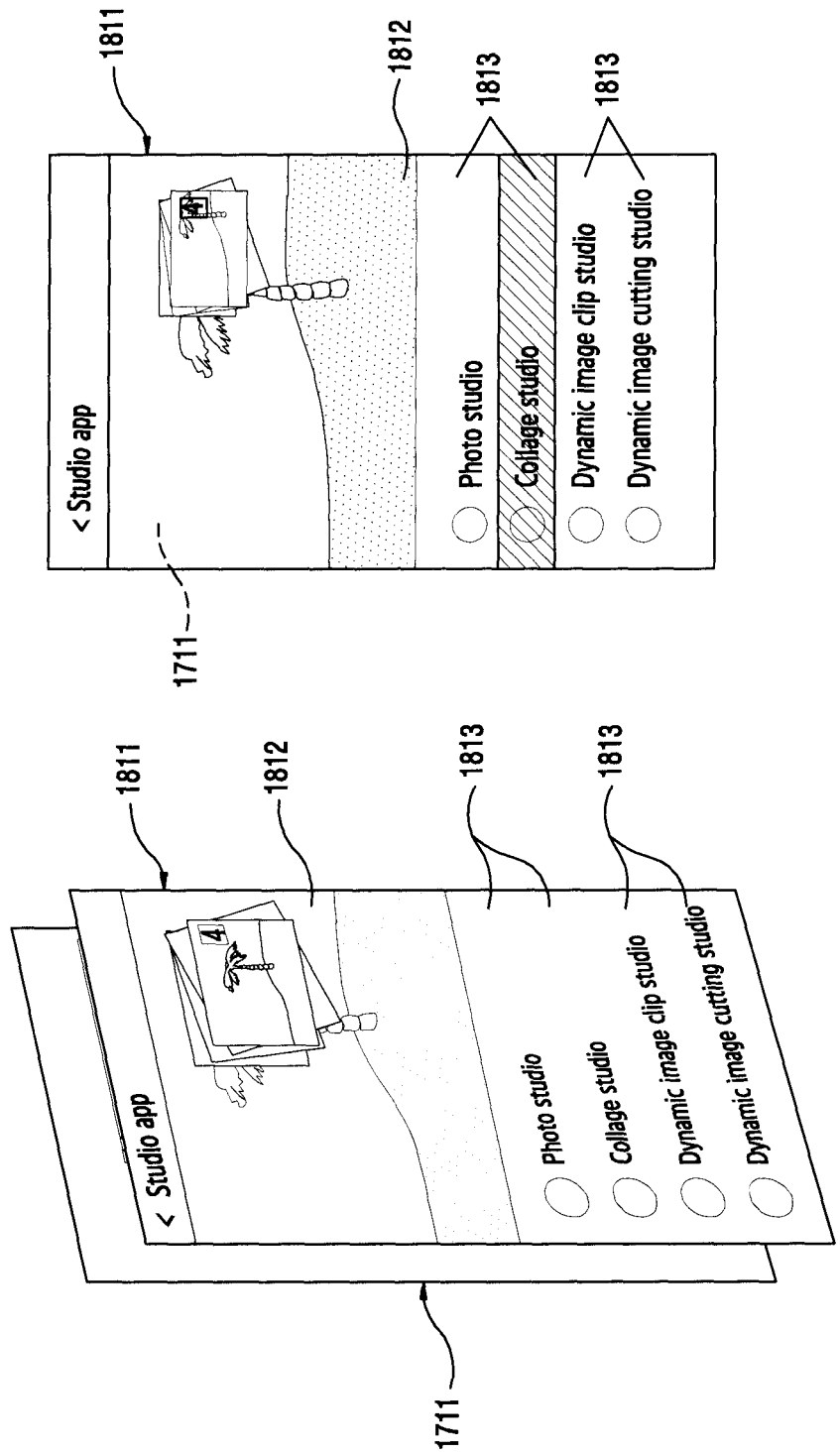

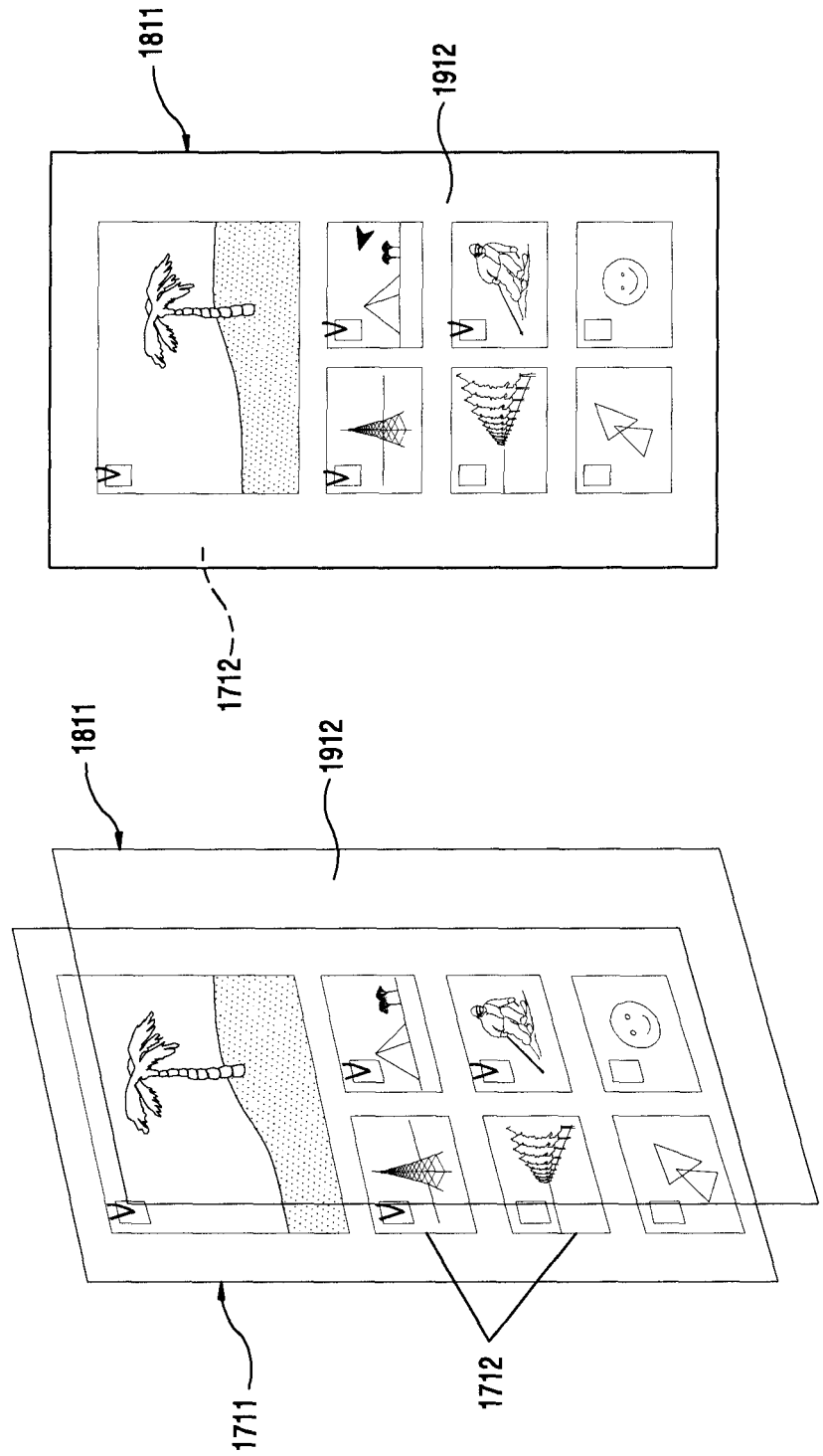

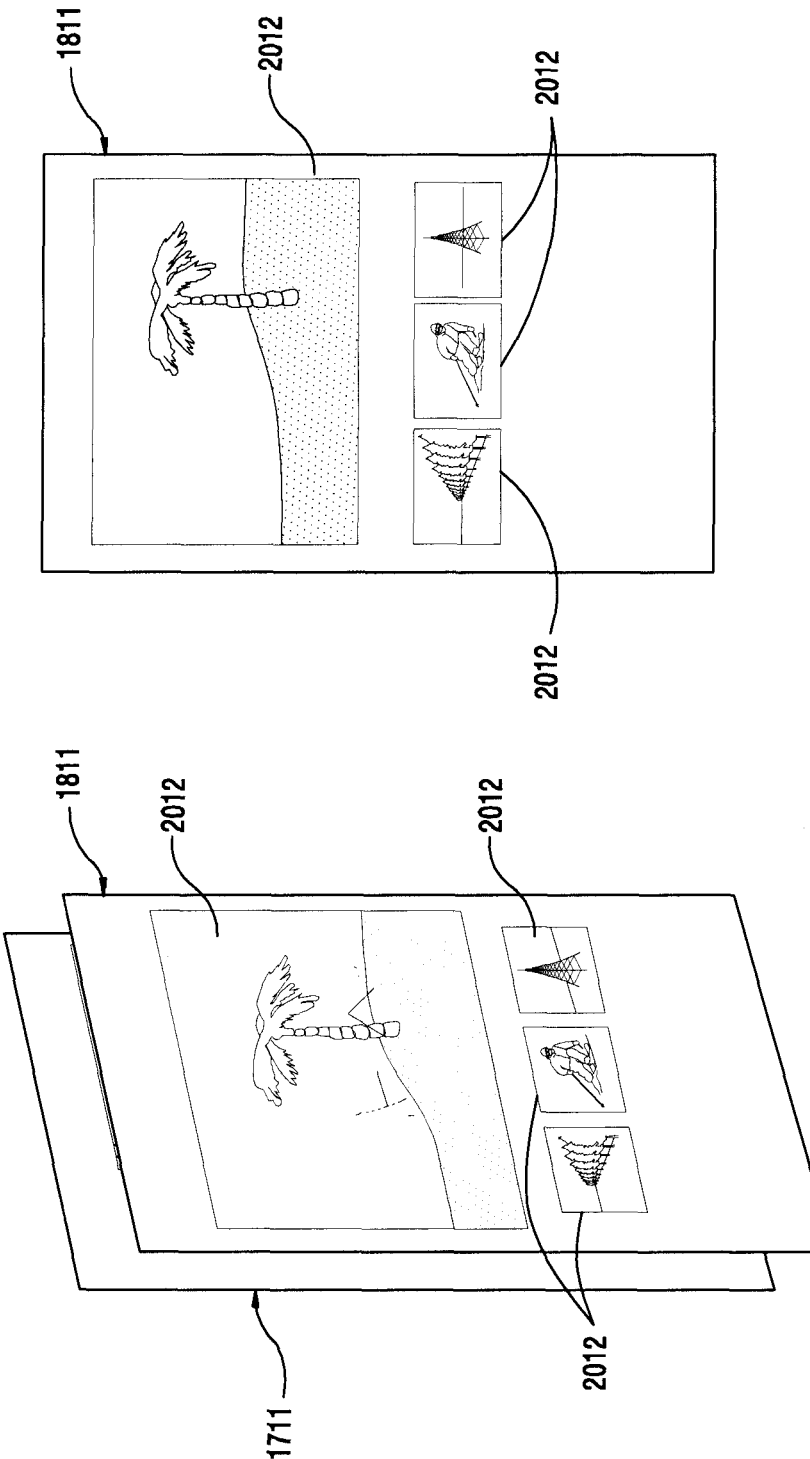

METHOD AND APPARATUS FOR DISPLAYING FUNCTION EXECUTION SCREENS

CLAIM OR PRIORITY

This application claims priority under 35 U.S.C. § 119(a) to Korean Application Serial No. 10-2015-0028658, which was filed in the Korean Intellectual Property Office on Feb. 27, 2015, the entire content of which is hereby incorporated by reference.

TECHNICAL FIELD

The present disclosure relates to electronic devices, in general, and more particularly to a method and apparatus for displaying function execution screens.

BACKGROUND

In general, an electronic device may perform various functions. For example, the functions may include a still image management function, a still image editing function, a dynamic image management function, a dynamic image editing function, a message writing function, a contact management function, and the like. The electronic device may include a display unit. The electronic device may execute each function and display a screen corresponding to each function on the display unit. For example, when a first function is executed, the electronic device may display a first screen. When a second function is requested during the execution of the first function, the electronic device may generate and display a second screen for the second function.

However, the electronic device has a problem in that switching from the first screen to the second screen is not smooth. For example, during the generation of the second screen, the electronic device may display an intermediate screen for notifying that the second screen is being generated. Accordingly, a user of the electronic device may recognize that it takes a long time to switch the first screen to the second screen.

SUMMARY

According to aspects of the disclosure, a method of an electronic device is provided. The method includes: displaying a first function execution screen corresponding to a first function; loading a second function; generating a layer that is at least partially transparent onto the first function execution screen; generating a second function execution screen corresponding to the second function; and displaying the second function execution screen on the layer.

According to aspects of the disclosure, an electronic device is provided comprising: a display unit; a memory; and at least one processor operatively coupled to the memory, configured to: display, on the display unit, a first function execution screen corresponding to a first function, load a second function, generate a layer that is at least partially transparent onto the first function execution screen, generate a second function execution screen corresponding to the second function, and display the second function execution screen on the display unit.

According to aspects of the disclosure, a non-transitory computer-readable storage medium is provided that stores one or more programs comprising instructions which, when executed by at least one processor cause the at least one processor to perform a method comprising the steps of: displaying a first function execution screen corresponding to a first function; loading a second function; generating a layer that is at least partially transparent onto the first function execution screen; generating a second function execution screen corresponding to the second function; and displaying the second function execution screen on the layer.

BRIEF DESCRIPTION OF THE DRAWINGS

The above and other aspects, features, and advantages of the present disclosure will be more apparent from the following detailed description taken in conjunction with the accompanying drawings, in which:

FIG. 11A is a diagram illustrating the operation of the process of FIG. 8, according to an embodiment of the present disclosure;

FIG. 11B is a diagram illustrating the operation of the process of FIG. 8, according to an embodiment of the present disclosure;

FIG. 13A is a diagram illustrating the operation of the process of FIG. 8, according to an embodiment of the present disclosure;

FIG. 13B is a diagram illustrating the operation of the process of FIG. 8, according to an embodiment of the present disclosure;

FIG. 18A is a diagram illustrating the operation of the process of FIG. 8, according to an embodiment of the present disclosure;

FIG. 18B is a diagram illustrating the operation of the process of FIG. 8, according to an embodiment of the present disclosure;

FIG. 19A is a diagram illustrating the operation of the process of FIG. 8, according to an embodiment of the present disclosure;

FIG. 19B is a diagram illustrating the operation of the process of FIG. 8, according to an embodiment of the present disclosure;

FIG. 20A is a diagram illustrating the operation of the process of FIG. 8, according to an embodiment of the present disclosure;

FIG. 20B is a diagram illustrating the operation of the process of FIG. 8, according to an embodiment of the present disclosure;

DETAILED DESCRIPTION

Figure 1:
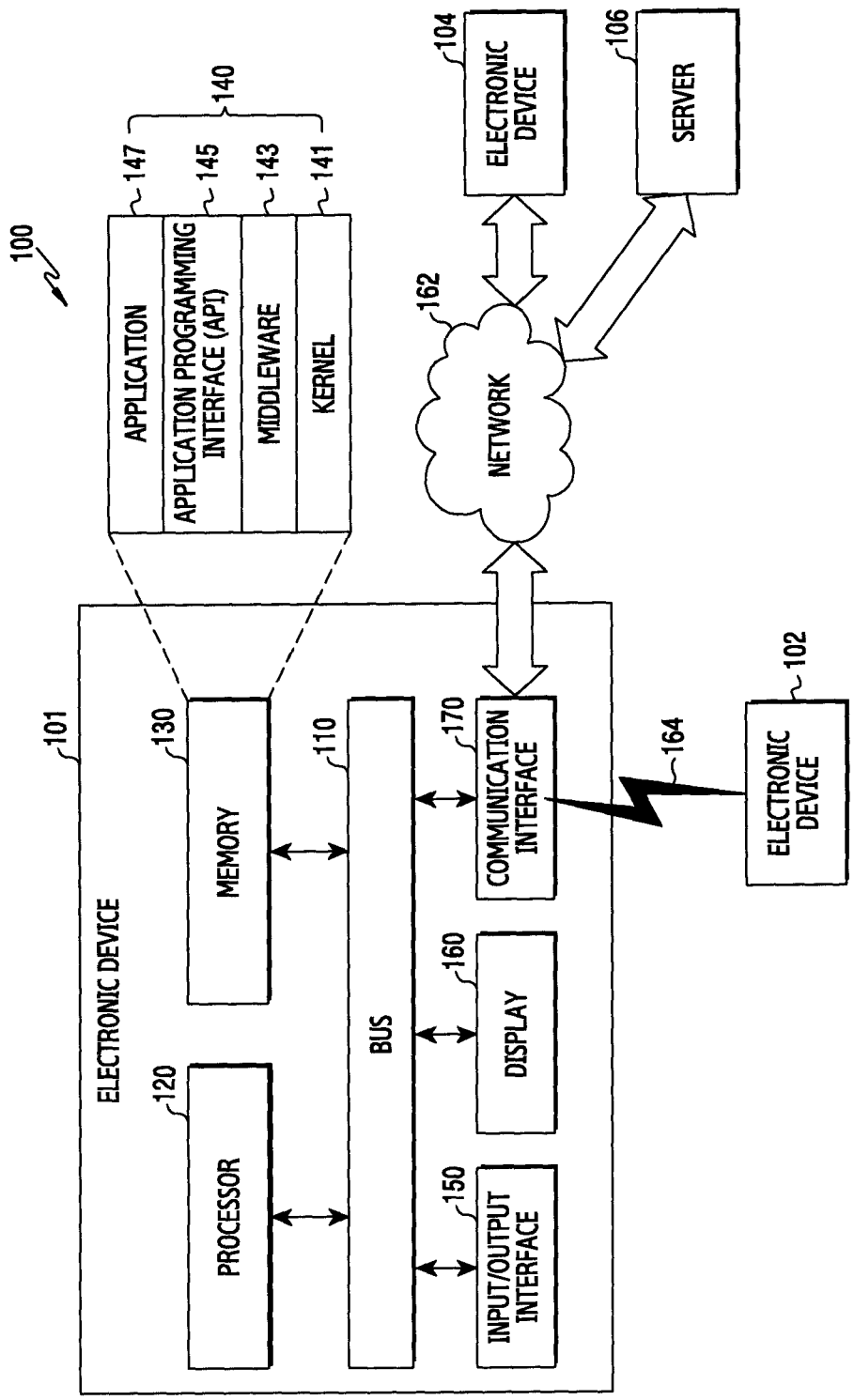
FIG. 1 is a diagram of an example of a network environment, according to an embodiment of the present disclosure.

Exemplary embodiments of the present disclosure will be described hereinbelow with reference to the accompanying drawings. However, various exemplary embodiments of the present disclosure are not limited to the specific embodiments and should be construed as including modification, equivalent and/or alternative of exemplary embodiments of the present disclosure. In the explanation of the drawings, similar reference numerals are used for similar elements.

The terms "have," "may have," "include," and "may include" used in the exemplary embodiments of the present disclosure indicate the presence of corresponding features (for example, elements such as numerical values, functions, operations, or parts), and do not preclude the presence of additional features.

The terms "A or B," "at least one of A or/and B," or "one or more of A or/and B" used in the exemplary embodiments of the present disclosure include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" used in various exemplary embodiments may modify various elements regardless of an order and/or importance of the corresponding elements, and does not limit the corresponding elements. These terms may be used for the purpose of distinguishing one element from another element. For example, a first user device and a second user device may indicate different user devices regardless of the order or importance. For example, a first element may be named a second element without departing from the scope of various exemplary embodiments of the present disclosure, and similarly, a second element may be named a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" used in the various exemplary embodiments of the present disclosure may be replaced with "suitable for," "having the capacity to," "designed to," "adapted to," "made to," or "capable of" according to a context. The term "configured to (set to)" does not necessarily mean "specifically designed to" at the hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in the various exemplary embodiments of the present disclosure are just for the purpose of describing particular exemplary embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as or to the contextual meanings of the relevant technology and should not be interpreted as having ideal or exaggerated meanings unless they are clearly defined in the various exemplary embodiments. According to circumstances, even the terms defined in the exemplary embodiments should not be interpreted as excluding the embodiments of the present disclosure.

An electronic device according to various exemplary embodiments of the present disclosure may include at least one of a smartphone, a tablet personal computer (PC), a mobile phone, a video phone, an electronic book reader, a desktop PC, a laptop PC, a netbook computer, a workstation, a server, a Personal Digital Assistant (PDA), a Portable Multimedia Player (PMP), an MP3 player, a mobile medical machine, a camera, or a wearable device (for example, smart glasses, a head-mounted-device (HMD), electronic clothing, an electronic bracelet, an electronic necklace, an electronic appcessory, electronic tattoos, a smart mirror, or a smart watch).

According to exemplary embodiments, the electronic device may be a smart home appliance. For example, the smart home appliance may include at least one of a television, a Digital Video Disk (DVD) player, a stereo, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Goggle TV™), a game console (for example, Xbox™, PlayStation™), an electronic dictionary, an electronic key, a camcorder, or an electronic album.

According to another exemplary embodiment, the electronic device may include at least one of various medical machines (for example, various portable medical measurement devices (a glucose monitor, a heart rate monitor, a blood pressure measuring device, or a thermometer), Magnetic Resonance Angiography (MRA), Magnetic Resonance Imaging (MRI), Computerized Tomography (CT), a tomograph, an ultrasound machine, and the like), a navigation device, a Global Positioning System (GPS) receiver, an Event Data Recorder (EDR), a Flight Data Recorder (FDR), an automotive infotainment device, electronic equipment for ship (for example, a navigation equipment for ship, a gyro compass, and the like), avionics, a security device, a head unit for vehicles, an industrial or home robot, an automatic teller machine (ATM) of a financial institution, point of sales (POS) of a store, or Internet of Things (for example, a lamp, various sensors, an electric or gas meter, a sprinkler, a fire alarm, a thermostat, a streetlamp, a toaster, an exercising machine, a hot water tank, a heater, a boiler, etc.).

According to an exemplary embodiment, the electronic device may include at least one of a part of furniture or a building/a structure, an electronic board, an electronic signature receiving device, a projector, and various measurement devices (for example, devices for measuring water, power, gas, radio waves, and the like). The electronic device according to various exemplary embodiments may be one or a combination of one or more of the above-mentioned devices. In addition, the electronic device according to various exemplary embodiments may be a flexible electronic device. In addition, the electronic device according to various exemplary embodiments is not limited to the above-mentioned devices, and may include a new electronic device accompanied by technology development.

Hereinafter, an electronic device according to various exemplary embodiments will be explained with reference to the accompanying drawings. The term "user" used in the various exemplary embodiments may refer to a person who uses the electronic device or a device that uses the electronic device (for example, an artificial intelligence electronic device).

FIG. 1 is a diagram of an example of a network environment, according to an embodiment of the present disclosure.

Referring to FIG. 1, the electronic device 101 in the network environment 100 according to various exemplary embodiments will be described. The electronic device 101 may include a bus 110, a processor 120, a memory 130, an input and output interface 150, a display 160, and a communication interface 170. According to an exemplary embodiment, the electronic device 101 may omit at least one of the elements or may include additional other elements.

The bus 110 may include a circuit which connects the elements 110-170 with one another and transmits communications (for example, a control message and/or data) between the elements.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In operation, the processor 120 may execute calculation or data processing related to control and/or communication of at least one other element of the electronic device 101.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. In operation, the memory 130 may store instructions or data which is related to at least one other element of the electronic device 101. According to an exemplary embodiment, the memory 130 may store software and/or a program 140. For example, the program 140 may include a kernel 141, middleware 143, an Application Programming Interface (API) 145, and/or an application program (or application) 147, and the like. At least some of the kernel 141, the middleware 143, or the API 145 may be referred to as an operating system (OS).

For example, the kernel 141 may control or manage system resources (for example, the bus 110, the processor 120, the memory 130, and the like) which are used for performing operations or functions implemented in the other programs (for example, the middleware 143, the API 145, or the application 147). In addition, the kernel 141 may provide an interface for allowing the middleware 143, the API 145, or the application program 147 to access an individual element of the electronic device 101 and control or manage the system resources.

For example, the middleware 143 may serve as an intermediary to allow the API 145 or the application program 147 to communicate with the kernel 141 and exchange data with the kernel 141.

In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program.

For example, the API 145 may be an interface for allowing the application 147 to control a function provided by the kernel 141 or the middleware 143, and, for example, may include at least one interface or function (for example, instructions) for controlling a file, controlling a window, processing an image, or controlling a text.

For example, the input and output interface 150 may serve as an interface for transmitting instructions or data inputted from a user or another external device to other element(s) of the electronic device 101. In addition, the input and output interface 150 may output instructions or data received from other element(s) of the electronic device 101 to the user or another external device.

For example, the display 160 may include a liquid crystal display (LCD), a light-emitting diode (LED) display, an organic light-emitting diode (OLED) display, or a microelectromechanical system (MEMS) display, or an electronic paper display. The display 160 may display various contents (for example, a text, an image, a video, an icon, a symbol, etc.) for the user. The display 160 may include a touch screen, and for example, may receive input of a touch using an electronic pen or a part of a user's body, a gesture, approach, or hovering.

For example, the communication interface 170 may establish communication between the electronic device 101 and an external device (for example, a first external electronic device 102, a second external electronic device 104, or a server 106). For example, the communication interface 170 may be connected to a network 162 via wireless communication or wire communication to communicate with the external device (for example, the second external electronic device 104, or the server 106).

The wireless communication may use, as a cellular communication protocol, at least one of Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), or Global System for Mobile Communications (GSM), etc. In addition, for example, the wireless communication may include short-distance communication 164. For example, the short-distance communication 164 may include at least one of Wireless Fidelity (WiFi), Bluetooth, Near Field Communication (NFC), GPS, etc. The wire communication may include at least one of a Universal Serial Bus (USB), a High-Definition Multimedia Interface (HDMI), a Recommended Standard 232 (RS-232), or plain old telephone service (POTS). The network 162 may include a telecommunications network, for example, at least one of a computer network (for example, a LAN or WAN), the Internet, or a telephone network.

Each of the first external electronic device 102 and the second external electronic device 104 may be the same kind of electronic device as the electronic device 101 or a different kind of device. According to an exemplary embodiment, the server 106 may include a group of one or more servers. According to various exemplary embodiments, all or a part of the operations executed by the electronic device 101 may be executed by another electronic device or a plurality of other electronic devices (for example, the electronic devices 102, 104 or the server 106). According to an exemplary embodiment, when the electronic device 101 should perform a certain function or service automatically or in response to a request, the electronic device 101 may request another device (for example, the electronic devices 102, 104 or the server 106) to perform at least some function related to the certain function or service additionally or instead of executing the function or service by itself. Another electronic device (for example, the electronic devices 102, 104 or the server 106) may execute the requested function or additional function, and transmit the result to the electronic device 101. The electronic device 101 may process the received result as it is or additionally, and provide the requested function or service. To achieve this, cloud computing, distributed computing, or client-server computing technology may be used, for example.

Figure 2:
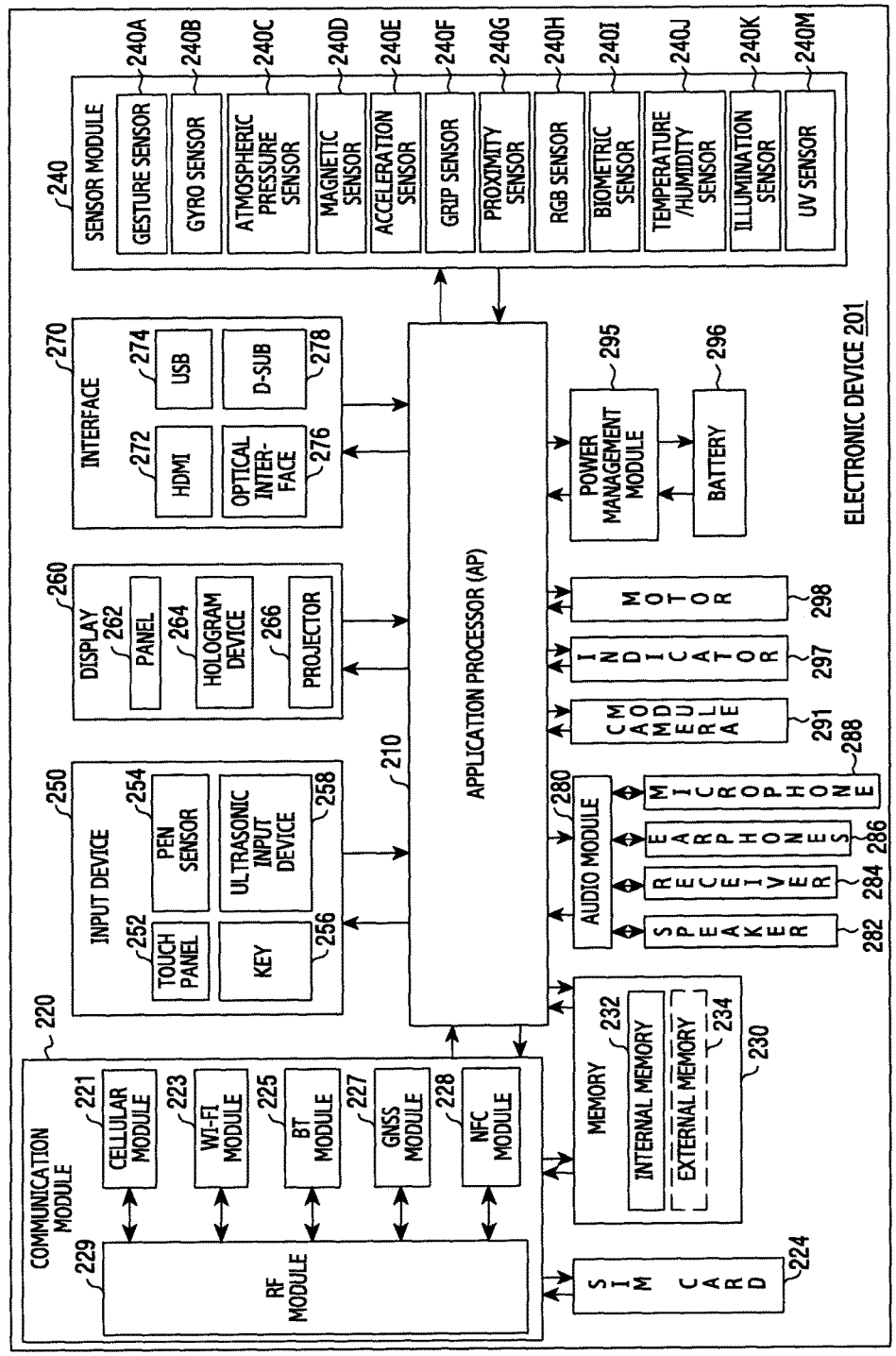
FIG. 2 is a block diagram of an example of an electronic device 201, according to an embodiment of the present disclosure.

FIG. 2 is a block diagram of an example of an electronic device 201, according to an embodiment of the present disclosure. For example, the electronic device 201 may include an entirety or part of the electronic device 101 shown in FIG. 1.

Referring to FIG. 2, the electronic device 201 may include one or more processors 210 (for example, an Application Processors (AP)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, or a motor 298.

The processor 210 may control a plurality of hardware or software elements connected to the processor 210 by driving an operating system or an application program, and may process and calculate various data. For example, the processor 210 may be implemented by using a System on Chip (SoC). According to an exemplary embodiment, the processor 210 may further include a Graphic Processing Unit (GPU) and/or an image signal processor. The processor 210 may include at least part of the elements shown in FIG. 2 (for example, the cellular module 221). The processor 210 may load instructions or data received from at least one of the other elements (for example, a non-volatile memory) into a volatile memory and process the instructions or data, and may store various data in the non-volatile memory.

The communication module 220 may have a same or similar configuration as or to that of the communication interface 170 of FIG. 1. For example, the communication module 220 may include the cellular module 221, a WiFi module 223, a BT module 225, a GPS module 227, an NFC module 228, and a Radio Frequency (RF) module 229.

The cellular module 221 may provide a voice call, a video call, a text service, or an internet service through a telecommunications network. According to an exemplary embodiment, the cellular module 221 may identify and authenticate the electronic device 201 in the telecommunications network by using the subscriber identification module 224 (for example, an SIM card). According to an exemplary embodiment, the cellular module 221 may perform at least some of the functions provided by the processor 210. According to an exemplary embodiment, the cellular module 221 may include a communication processor (CP).

The WiFi module 223, the BT module 225, the GPS module 227, or the NFC module 228 each may include a processor for processing data received and transmitted through a corresponding module. According to an exemplary embodiment, at least some (for example, two or more) of the cellular module 221, the WiFi module 223, the BT module 225, the GPS module 227, or the NFC module 228 may be included in a single integrated chip (IC) or a single IC package.

The RF module 229 may transmit and receive communication signals (for example, RF signal). For example, the RF module 229 may include a transceiver, a Power Amp Module (PAM), a frequency filter, a Low Noise Amplifier (LNA), an antenna, etc. According to another exemplary embodiment, at least one of the cellular module 221, the WiFi module 223, the BT module 225, the GPS module 227, or the NFC module 228 may transmit and receive an RF signal via a separate RF module.

The subscriber identification module 224 may include a card and/or an embedded SIM including the subscriber identification module, and may include its unique identification information (for example, an Integrated Circuit Card Identifier (ICCID)) or subscriber information (for example, International Mobile Subscriber Identity (IMSI)).

The memory 230 (for example, the memory 130) may include an internal memory 232 or an external memory 234. For example, the internal memory 232 may include at least one of a volatile memory (for example, a Dynamic Random Access Memory (DRAM), a Static Random Access Memory (SRAM), a Synchronous DRAM (SDRAM), and the like)

and a non-volatile memory (for example, an One-Time Programmable Read-Only Memory (OTPROM), a Programmable Read-Only Memory (PROM), an Erasable Programmable Read-Only Memory (EPROM), an Electrically Erasable Programmable Read-Only Memory (EEPROM), a mask ROM, a flash ROM, a flash memory (for example, a NAND flash memory, a NOR flash memory, and the like), a hard drive, a solid state drive (SSD).

For example, the external memory 234 may further include a flash drive, for example, Compact Flash (CF), Secure Digital (SD), Micro-SD, Mini-SD, extreme-Digital (xD), a Multi Media Card (MMC), memory stick, and the like. The external memory 234 may be functionally and/or physically connected to the electronic device 201 through various interfaces.

The sensor module 240 may measure a physical quantity or detect an operation state of the electronic device 201, and may convert measured or detected information into electric signals. The sensor module 240 may include at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., Red, Green, Blue (RGB) sensor), a biosensor 240I, a temperature/humidity sensor 240J, an illumination sensor 240K, and a Ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared ray (IR) sensor, an iris sensor (not shown), and/or a fingerprint sensor (not shown), and the like. The sensor module 240 may further include a control circuit to control at least one sensor included therein. According to an exemplary embodiment, the electronic device 201 may further include a processor configured to control the sensor module 240 as a part of the processor 210 or a separate part, and may control the sensor module 240 while the processor 210 is in a sleep state.

The input device 250 may include a touch panel 252, a (digital) pen sensor 254, a key 256, or an ultrasonic input device 258. The touch panel 252 may use at least one method of capacitive, resistive, infrared, and ultrasonic methods. In addition, the touch panel 252 may further include a control circuit. The touch panel 252 may further include a tactile layer to provide a tactile response to the user.

The (digital) pen sensor 254 may be a part of the touch panel or may include a separate detection sheet. The key 256 may include a physical button, an optical key, or a keypad. The ultrasonic input device 258 may detect ultrasonic waves generated in an input tool through a microphone (for example, the microphone 288), and identify data corresponding to the detected ultrasonic waves.

The display 260 (e.g., the display 160) may include a panel 262, a hologram device 264, or a projector 266. The panel 262 may have a same or similar configuration as or to that of the display 160 of FIG. 1. For example, the panel 262 may be implemented to be flexible, transparent, or wearable. The panel 262 may be configured as a single module along with the touch panel 252. The hologram device 264 may show a stereoscopic image in the air using interference of light. The projector 266 may display an image by projecting light onto a screen. The screen may be located inside or outside the electronic device 201. According to an exemplary embodiment, the display 260 may further include a control circuit to control the panel 262, the hologram device 264, or the projector 266.

The interface 270 may include a High Definition Multimedia Interface (HDMI) 272, a Universal Serial Bus (USB) 274, an optical interface 276, or D-subminiature (sub) 278. The interface 270 may be included in the communication interface 170 shown in FIG. 1. Additionally or alternatively, the interface 270 may include a Mobile High Definition Link (MHL) interface, a Secure Digital (SD) card/Multimedia Card (MMC) interface or Infrared Data Association (IrDA) standard interface.

The audio module 280 may convert a sound and an electric signal bidirectionally. For example, at least some elements of the audio module 280 may be included in the input and output interface 150 shown in FIG. 1. The audio module 280 may process sound information which is input or output through a speaker 282, a receiver 284, an earphone 286, or a microphone 288.

The camera module 291 is a device for photographing a still image and a moving image, and, according to an exemplary embodiment, the camera module 291 may include one or more image sensors (for example, a front surface sensor or a rear surface sensor), a lens, an Image Signal Processor (ISP), or a flash (for example, a Light Emitting Diode (LED) or a xenon lamp).

The power management module 295 may manage the power supply of the electronic device 201. According to an exemplary embodiment, the power management module 295 may include a Power Management IC (PMIC), a charger IC, or a battery or fuel gauge. For example, the PMIC may have a wire charging method and/or a wireless charging method. The wireless charging method may include a magnetic resonance method, a magnetic induction method, or an electromagnetic wave method, and an additional circuit for charging wirelessly, for example, a coil loop, a resonant circuit, a rectifier, and the like may be added. For example, the battery gauge may measure a remaining battery life of the battery 296, a voltage, a current, or temperature during charging. The battery 296 may include a rechargeable battery and/or a solar battery.

The indicator 297 may display a specific state of the electronic device 201 or a part of it (for example, the processor 210), for example, a booting state, a message state, or a charging state. The motor 298 may convert an electric signal into a mechanical vibration, and cause a vibration or haptic effect. Although not shown, the electronic device 201 may include a processing device (for example, a GPU) for supporting a mobile TV. The processing device for supporting the mobile TV may process media data according to standards such as Digital Multimedia Broadcasting (DMB), Digital Video Broadcasting (DVB), or media flow.

Each of the above-described elements of the electronic device according to various exemplary embodiments of the present disclosure may be comprised of one or more components, and the names of the elements may vary according to the kind of the electronic device. The electronic device according to various exemplary embodiments may include at least one of the above-described elements, and some of the elements may be omitted or an additional element may be further included. In addition, some of the elements of the electronic device according to various exemplary embodiments may be combined into a single entity, and may perform the same functions as those of the elements before being combined.

Figure 3:
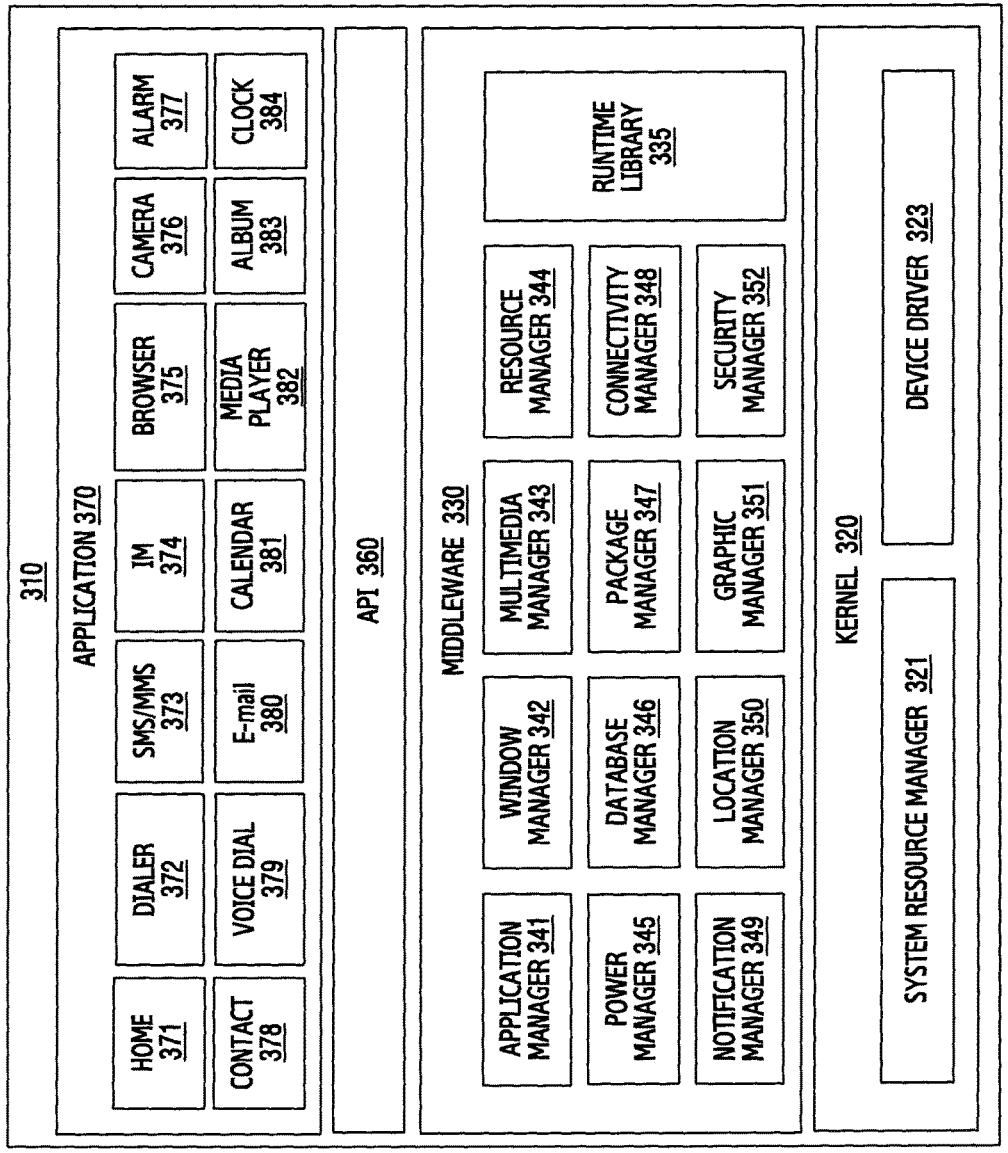
FIG. 3 is a block diagram of an example of a program module, according to an embodiment of the present disclosure.

FIG. 3 is a block diagram of an example of a program module, according to an embodiment of the present disclosure. According to an exemplary embodiment, the program module 310 (for example, the program 140) may include an Operating System (OS) for controlling resources related to an electronic device (for example, the electronic device 101) and/or various applications (for example, the application 147) driven on the OS. For example, the OS may be Android, iOS, Windows, Symbian, Tizen, Bada, or the like.

Referring to FIG. 3, the program module 310 may include a kernel 320, middleware 330, an Application Programming Interface (API) 360, and/or an application 370. At least part of the program module 310 may be preloaded on the electronic device or downloaded from an external device (for example, the electronic device 102, 104, the server 106, or the like).

The kernel 320 (for example, the kernel 141) may include a system resource manager 321 and/or a device driver 323. The system resource manager 321 may control, allocate or collect the system resources. According to an exemplary embodiment, the system resource manager 321 may include a process manager, a memory manager, a file system manager, and the like. The device driver 323 may include a display driver, a camera driver, a Bluetooth driver, a shared memory driver, a Universal Serial Bus (USB) driver, a keypad driver, a WiFi driver, an audio driver, or an Inter-Process Communication (IPC) driver, for example.

The middleware 330 may provide functions which are commonly required by the application 370 or may provide various functions to the application 370 through the API 360 such that the application 370 can effectively use limited system resources in the electronic device. According to an exemplary embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

For example, the runtime library 335 may include a library module which is used by a compiler to add a new function through a programming language while the application 370 is executed. The runtime library 335 may perform functions related to input/output management, memory management, an arithmetic function, and the like.

The application manager 341 may manage a life cycle of at least one of the applications 370, for example. The window manager 342 may manage GUI resources used in a screen. The multimedia manager 343 grasps a format necessary for reproducing various media files and encodes or decodes the media files by using a Codec suited to the corresponding format. The resource manager 344 may manage resources such as a source code, a memory, or a storage space of at least one of the applications 370.

The power manager 345 operates along with a Basic Input/Output System (BIOS) to manage a battery or power and provide power information necessary for operations of the electronic device. The database manager 346 may generate, search, or change a database which is used in at least one of the applications 370. The package manager 347 may manage the installation or updating of an application which is distributed in the form of a package file.

The connectivity manager 348 may manage wireless connection of WiFi, Bluetooth, and the like. The notification manager 349 may display or notify an event such as a message arrived, an appointment, a notification of proximity in such a manner that the event does not hinder the user. The location manager 350 may manage location information of the electronic device. The graphic manager 350 may manage a graphic effect to be provided to the user or a relevant user interface. Herein, the graphic manager 351 may include a DALi graphic engine. The security manager 352 may provide an overall security function necessary for system security or user authentication. According to an exemplary embodiment, when the electronic device (for example, the electronic device 101) is equipped with a telephony function, the middleware 330 may further include a telephony manager to manage a speech or video telephony function of the electronic device.

The middleware 330 may include a middleware module to form a combination of the various functions of the above-described elements. The middleware 330 may provide a module which is customized according to a kind of OS to provide a distinct function. In addition, the middleware 330 may dynamically delete some of the existing elements or may add new elements.

The API 360 (for example, the API 145) is a set of API programming functions and may be provided as a different configuration according to an OS. For example, in the case of Android or iOS, a single API set may be provided for each platform. In the case of Tizen, two or more API sets may be provided for each platform.

The application 370 (for example, the application 147) may include one or more applications for providing functions, such as a home 371, a dialer 372, a Short Message Service (SMS)/Multimedia Messaging Service (MMS) 373, an Instant Message (IM) 374, a browser 375, a camera 376, an alarm 377, contacts 378, a voice dial 379, an email 380, a calendar 381, a media player 382, an album 383, or a clock 384, or health care (for example, measuring exercise or a blood sugar), or providing environment information (for example, information on atmospheric pressure, humidity, or temperature), for example.

According to an exemplary embodiment, the application 370 may include an application for supporting information exchange between the electronic device (for example, the electronic device 101) and an external electronic device (for example, the electronic devices 102, 104) (hereinafter, referred to as an "information exchange application" for the convenience of explanation). The information exchange application may include a notification relay application for relaying specific information to an external electronic device or a device management application for managing an external electronic device.

For example, the notification relay application may include a function of relaying notification information generated by other applications of the electronic device (for example, the SMS/MMS application, the email application, the health care application, the environment information application, and the like) to an external electronic device (for example, the electronic device 102, 104). In addition, the notification relay application may receive notification information from an external electronic device and may relay the same to the user.

For example, the device management application may manage (for example, install, delete or update) at least one function of an external electronic device (for example, the electronic device 104) communicating with the electronic device (for example, turning on/off an external electronic device (or some parts) or adjusting brightness (or resolution) of a display), an application operating in the external electronic device or a service provided by the external electronic device (for example, a calling service or a message service).

According to an exemplary embodiment, the application 370 may include an application (for example, a health care application of a mobile medical device) which is specified according to the attribute of the external electronic device (for example, the electronic device 102, 104). According to an exemplary embodiment, the application 370 may include an application received from an external electronic device (for example, the server 106 or the electronic devices 102, 104). According to an exemplary embodiment, the application 370 may include a preloaded application or a third party application which may be downloaded from a server. The names of the elements of the program module 310 according to the illustrated exemplary embodiments may be changed according to a kind of OS.

According to various exemplary embodiments, at least part of the program module 310 may be implemented by using software, firmware, hardware, or a combination of two or more of them. At least part of the program module 310 may be implemented (for example, executed) by a processor (for example, the processor 210). At least part of the program module 310 may include a module, a program, a routine, sets of instructions, or a process to perform one or more functions, for example.

Figure 4:
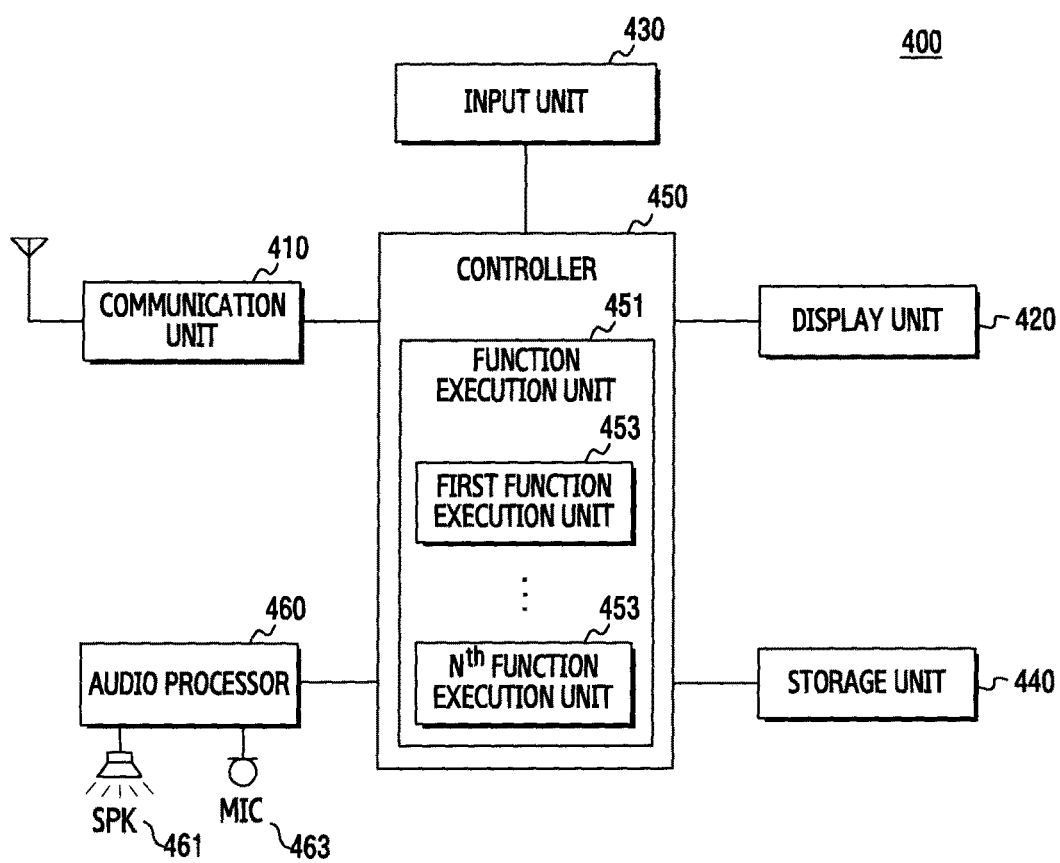
FIG. 4 is a block diagram of an example of an electronic device, according to an embodiment of the present disclosure.

FIG. 4 is a block diagram of an example of an electronic device 400, according to an embodiment of the present disclosure. As illustrated, the electronic device 400 may include a communication unit 410, a display unit 420, an input unit 430, a storage unit 440, a controller 450, and an audio processor 460.

The communication unit 410 may include any suitable type of communications interface, such as at least one of a Long Term Evolution (LTE) communications interface, a Wideband Code Division Multiple Access (WCDMA) communications interface, a Global System for Mobile Communications (GSM) communications interface, a Wi-Fi communications interface, a Bluetooth communications interface, and a Near Field Communications (NFC) communications interface. The communication unit 410 may communicate with an external device (not shown) through various communication schemes. For example, the external device may include an electronic device, a base station, a server, and a satellite. To this end, the communication unit 410 may access at least one of a mobile communication network, a data communication network, and a short-range communication network. For example, communication schemes may include LTE, WCDMA, GSM, Wi-Fi, Bluetooth, and NFC.

The display unit 420 may include any suitable type of display. For example, the display unit 420 may include a Liquid Crystal Display (LCD), a Light Emitting Diode (LED) display, an Organic LED (OLED) display, a Micro Electro Mechanical System (MEMS) display, and an electronic paper display.

The input unit 430 may generate input data in the electronic device 400. The input unit 430 may generate input data in response to a user input of the electronic device 400. For example, the input unit 430 may include a keypad, a dome switch, a physical button, a touch panel, a jog & shuttle, and a sensor. The input unit 430 may be coupled to the display unit 420 to be implemented as a touch screen.

The storage unit 440 may include any suitable type of volatile or non-volatile memory, such as Random-access Memory (RAM), Read-Only Memory (ROM), Network Accessible Storage (NAS), cloud storage, a Solid State Drive (SSD), etc. In operation, the storage unit 440 may store a program for performing various functions. The storage unit 440 may store data generated while programs are executed. The storage unit 440 may store contents. For example, the contents may be an image, a video, audio data, or the like.

The controller 450 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The controller 450 may be used to implement a function execution unit 451. The function execution unit 451 may be operable to execute various functions. The function execution unit 451 may include a plurality of function processors 453. For example, the function execution unit 451 may include one or more function processors 453. The function processors 453 may perform various functions. When any of the functions is executed, the function's respective processor(s) 453 may display a function execution screen corresponding to the function. For example, the function may be performed by an application and may be associated with a respective driving engine for executing the function that is part of the application.

Figure 5:
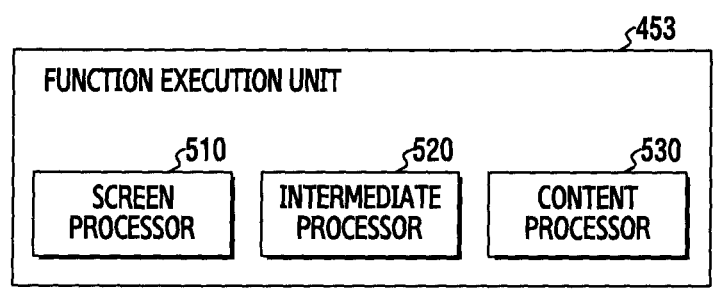
FIG. 5 is a block diagram of an example of a function processor, according to an embodiment of the present disclosure.

FIG. 5 is a block diagram of an example the function processor 453 of FIG. 4, according to an embodiment of the present disclosure. As illustrated, each of the function processors 453 may include a screen processor 510, an intermediate processor 520, and a content processor 530.

The screen processor 510 may generate a function execution screen corresponding to a particular function. The screen processor 510 may display the function execution screen. The function execution screen may include at least one layer. The layer may be a background layer for displaying a background or an operation layer for executing the particular function. The screen processor 510 may display contents associated with a particular function on the background layer. The screen processor 510 may display at least one icon associated with the function on the operation layer. Additionally or alternatively, the screen processor 510 may display all available contents and at least one icon on the same layer. To this end, the screen processor 510 may activate the intermediate processor 520 and the content processor 530.

The intermediate processor 520 may process contents to prepare temporary contents. Each of the contents may have a predetermined processing capacity and processing resolution. According to an embodiment, the intermediate processor 520 may prepare temporary contents having a processing capacity (e.g., size, color depth, etc.) smaller than the processing capacity of the contents. For example, the intermediate processor 520 may prepare the temporary contents in accordance with a processing capacity. Additionally or alternatively, the intermediate processor 520 may prepare the temporary contents to have a preset resolution smaller than the resolution of the contents. For example, the intermediate processor 520 may prepare the temporary contents with a preset preview resolution. To this end, the intermediate processor 520 may decode contents. Further, the intermediate processor 520 may form an operation interface. Forming the operation interface may include generating at least one icon and linking the icon with a respective driving engine. Accordingly, the intermediate processor 520 may connect each generated icon with a respective driving engine. The intermediate processor 520 may be activated under a control of the screen processor 510. Afterwards, when the preparation of contents and the formation of the operation interface are completed, the intermediate processor 520 may be deactivated.

The content processor 530 may process contents. The content processor 530 may process the contents to have a processing capacity. The content processor 530 may process the contents to have a specific resolution. Additionally or alternatively, the content processor 530 may decode the contents to have a specific processing capacity. The content processor 530 may include at least one content processing module. The content processor 530 may configure a plurality of content processing modules according to at least one of the specific processing capacity or the specific resolution. For example, when the contents include an image, and a processing resolution of the image exceeds a threshold, the content processor 530 may instantiate a plurality of content processing modules. Additionally or alternatively, when the contents include a plurality of images, the content processor 530 may configure a plurality of content processing modules. The content processor 530 may be activated under a control of the screen processor 510. Afterwards, when the generation of the background layer is completed, the content processor 530 may be deactivated.

For example, one of the function execution units 453 may operate as a first function processor 454. The first function processor 454 may execute a first function. When the first function is executed, the first function processor 454 may display a first function execution screen on the display unit 420. Another one of the function execution unit 453 may operate as a second function processor 456. When a second function is executed by the second function processor 456, the second function processor 456 may display on the display unit 420 a second function execution screen that corresponds to the second function. For example, the second function processor 456 may display the second function execution screen in the same size as the first function execution screen and at the same location as the first function execution screen. When a request for executing the second function is detected while the first function is being executed, the first function processor 454 may load the second function into the second function processor 456, after which the second function processor 456 may execute the second function.

The audio processor 460 processes an audio signal. At this time, the audio processor 460 may include a speaker (SPK) 461 and a microphone (MIC) 463. That is, the audio processor 460 may reproduce an audio signal output from the controller 450 through the speaker 461. Further, the audio processor 460 may transfer an audio signal generated by the microphone 463 to the controller 450.

Figure 6:
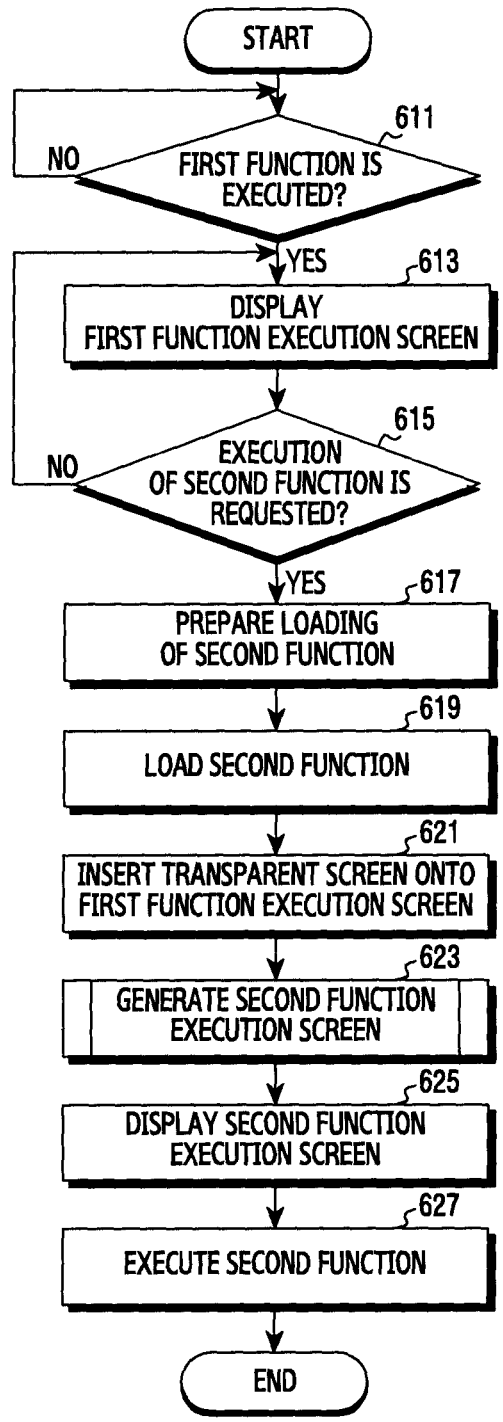
FIG. 6 is a flowchart of an example of a process, according to an embodiment of the present disclosure.

FIG. 6 is a flowchart of an example of a process, according to an embodiment of the present disclosure. According to the process, in operation 611, the controller 450 may detect whether a first function is executed. In operation 613, the controller 450 may display a first function execution screen in response to detecting that the first function is executed. The controller 450 may display the first function execution screen on the display unit 420. The first function execution screen may include at least one layer. For example, the first function execution screen may include a first layer. The first function execution screen and the first layer may have the same size as that of the display unit 420. The controller 450 may display all of the contents that are associated with the first function and at least one icon on the first layer.

In some implementations, the first function execution screen may include the first layer and a second layer. The first layer may be a background layer and the second layer may be an operation layer. The second layer may be superimposed on the first layer. The second layer may have a size that is smaller than that of the display unit 420 or have the same size as that of the display unit 420. The controller 450 may display contents on the first layer and at least one icon on the second layer. Accordingly, the display unit 420 may output the first function execution screen.

In operation 615, the controller 450 may detect whether a request for executing a second function is received. For example, the second function execution request may be detected based on receiving a predetermined input via the input unit 430.

In operation 617, the controller 450 may perform one or more tasks in preparation for executing the second function. For example, the controller 450 may remove the icon in the first function execution screen. Additionally or alternatively, the controller 450 may remove the second layer from the first function execution screen. Accordingly, the display unit 420 may continuously output the first layer. In operation 619, the controller 450 may load the second function.

In operation 621, the controller 450 may generate a transparent screen at a location of the first function execution screen. More particularly, in some implementations, the controller 450 may generate a third layer for use in a second function execution screen and configure the third layer to be at least partially transparent. The second function execution screen may include at least one layer. For example, the second function execution screen may include the third layer. Additionally or alternatively, the second function execution screen may include the third layer and a fourth layer. The third layer may be a background layer and the fourth layer may be an operation layer. The second function execution screen and the third layer may have the same size as that of the display unit 420. The fourth layer may be superimposed on the third layer. The fourth layer may have a size smaller than that of the display unit 420 (and/or the third layer) or have the same size as that of the display unit 420. Accordingly, the display unit 420 may continuously output the function execution screen.

In operation 623, the controller 450 may generate the second function execution screen. The controller 450 may process contents. The controller 450 may form an operation interface. The controller 450 may perform operation 623 after operation 621. Additionally or alternatively, the controller 450 may perform operations 621 and 623 concurrently.

Figure 7:
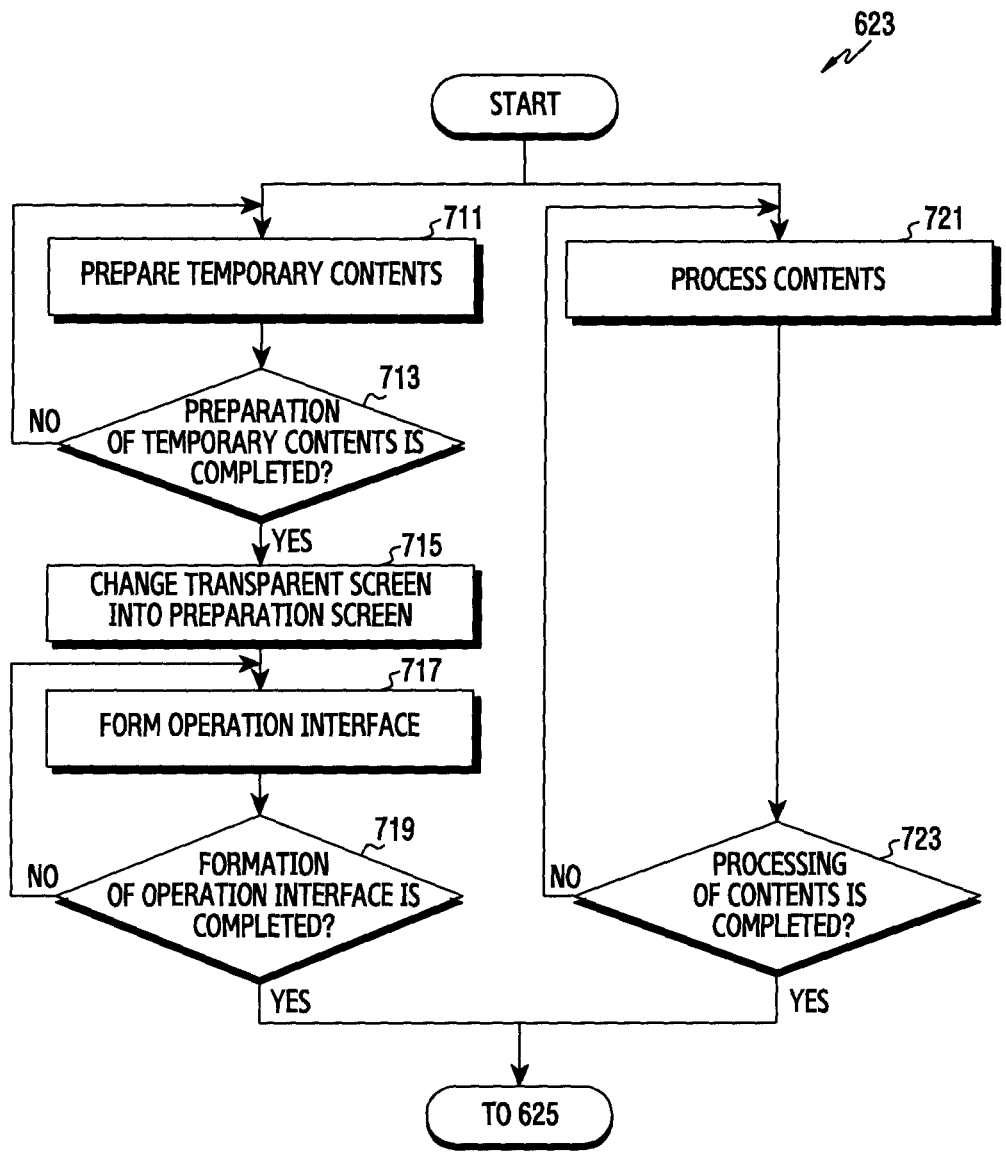
FIG. 7 is a flowchart of an example of a sub-process associated with the process of FIG. 6, according to an embodiment of the present disclosure.

FIG. 7 is a flowchart of an example of a sub-process for performing operation 623. According to the process, in operation 711, the controller 450 may prepare temporary contents by processing contents associated with the second function (e.g., one or more content items). The contents may have a predetermined processing capacity and processing resolution. The controller 450 may prepare the temporary contents with a preset processing capacity that is smaller than the processing capacity of the contents. For example, the controller 450 may prepare the temporary contents with a preset preview capacity. Additionally or alternatively, the controller 450 may prepare the temporary contents to have a preset resolution smaller than the resolution. For example, the intermediate processor 520 may prepare the temporary contents with a preset resolution. To this end, the controller 450 may decode the contents. Additionally or alternatively, when the contents correspond to an image or a video, the controller 450 may enlarge a thumbnail of the contents.

In operation 713, the controller 450 may detect that the preparation of the temporary content is completed.

In operation 715, the controller 450 may change the transparent screen into a preparation screen. More specifically, the controller 450 may generate the preparation screen by displaying the temporary contents on the third layer. Afterwards, the controller 450 may display the preparation screen. To this end, the display unit 420 may output the preparation screen on the display unit 420.

In operation 717, the controller 450 may form an operation interface that is associated with the second function. More particularly, the controller 450 may generate at least one icon and associate each icon with a respective driving engine. Accordingly, the controller 450 may associate each icon with a respective driving engine.

In operation 710, the controller 450 may detect whether the formation of the operation interface is completed. If the formation is completed, the controller 450 may proceed to operation 625. Otherwise, if the formation is not completed, the controller 450 may return to operation 717.

In operation 721, the controller 450 may process the contents associated with the second function. More particularly, the controller 450 may process contents to have the processing capacity. The controller 450 may process the contents to have the processing resolution. The controller 450 may decode the contents.

In operation 723, the controller 450 may detect whether the processing of the contents is completed. Afterwards, in response to detecting that the processing of the content is completed, the controller may proceed to operation 625.

In some implementations, the controller 450 may execute operations 711 and 721 concurrently. Additionally or alternatively, in some implementations, the controller 450 may perform at least some of operations 711 to 719 concurrently with operation 721.

The controller 450 may display the second function execution screen in operation 625. The controller 450 may change the preparation screen into the second function execution screen. The controller 450 may display the contents on the third layer. The controller 450 may display the icon on the third layer. Additionally or alternatively, the controller 450 may display the icon on the fourth layer. The controller 450 may superimpose the fourth layer on at least a portion of the third layer. Accordingly, the display unit 420 may output the second function execution screen. The controller 450 may execute the second function in operation 627. The controller 450 may execute the first function in the background and the second function in the foreground.

Figure 8:
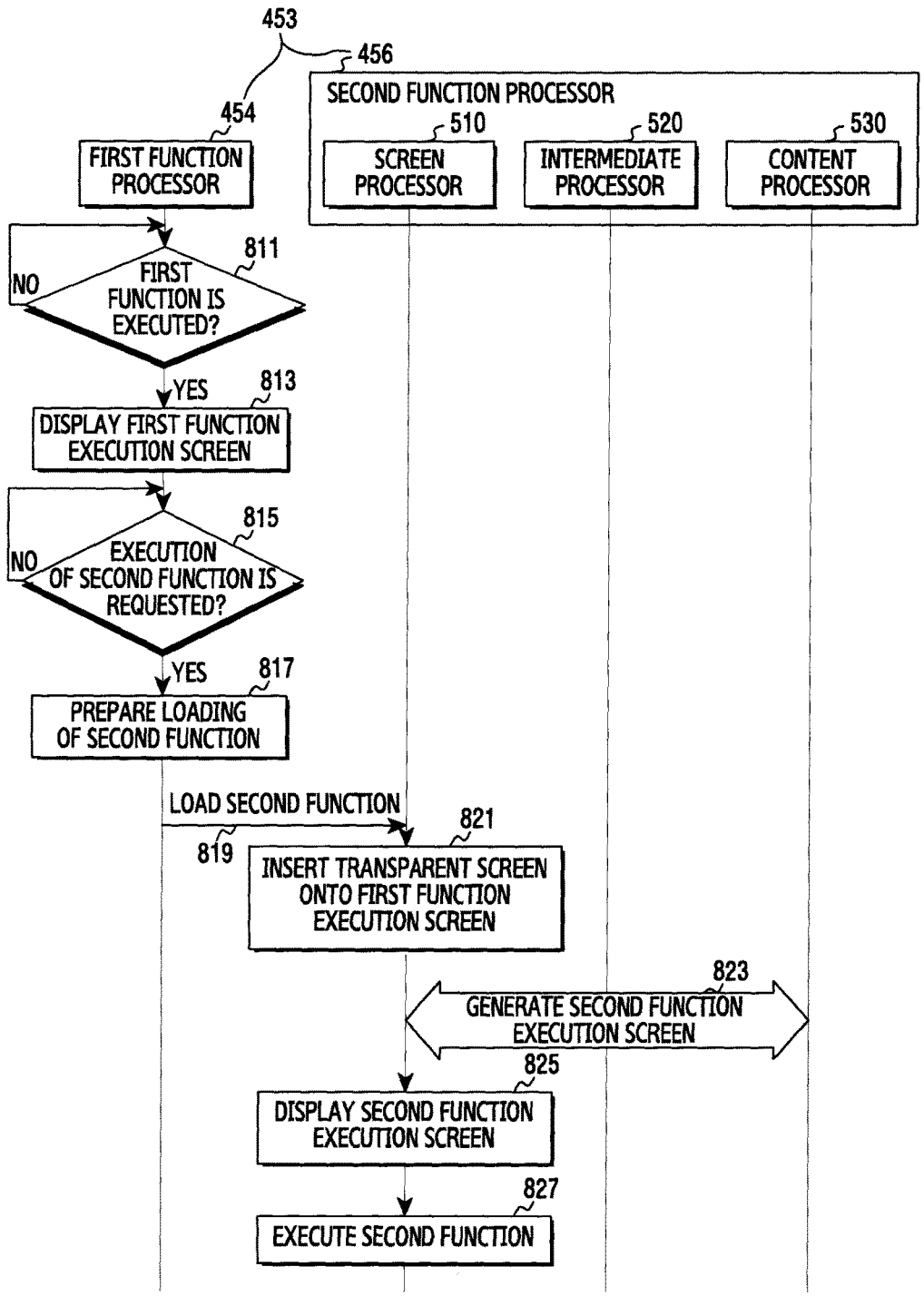
FIG. 8 is a flowchart of an example of a process, according to an embodiment of the present disclosure.

FIG. 8 is a flowchart of an example of a process, according to an embodiment of the present disclosure. FIGS. 10, 11, 12, 13, 14, and 15 illustrate an example associated with the process of FIG. 8. FIGS. 17, 18, 19, 20, and 21 illustrate another example associated with the process of FIG. 8.

In operation 811, the first function processor 454 may detect whether the first function is executed.

In operation 813, the first function processor 454 may display first function execution screens 1010 and 1710 (shown in FIGS. 10A and 17A) in response to detecting that the first function is executed. The first function processor 454 may display the first function execution screens 1010 and 1710 on the display unit 420. The first function execution screens 1010 and 1710 may include one or more layers 1011, 1013, 1711, and 1713. For example, the first function execution screens 1010 and 1710 may include first layers 1011 and 1711 and second layers 1013 and 1713. Of these layers, the first layer may be a background layer and the second layer may be an operation layer. The first function execution screens 1010 and 1710 and the first layers 1011 and 1711 may have the same size as that of the display unit 420. The second layers 1013 and 1713 may be superimposed on the first layers 1011 and 1711. The second layers 1013 and 1713 may have a size smaller than that of the display unit 420 or have the same size as that of the display unit 420.

Figure 10A:
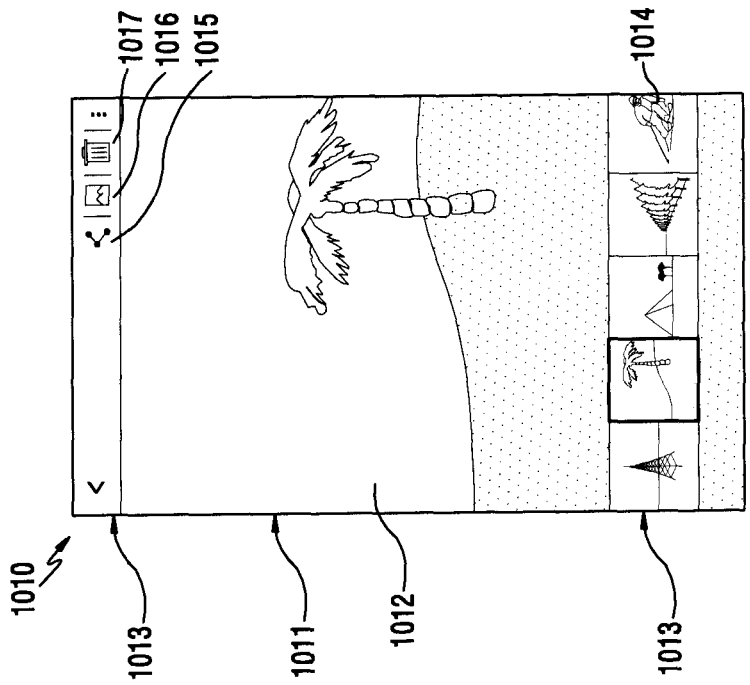
FIG. 10A is a diagram illustrating the operation of the process of FIG. 8, according to an embodiment of the present disclosure.
Figure 10B:
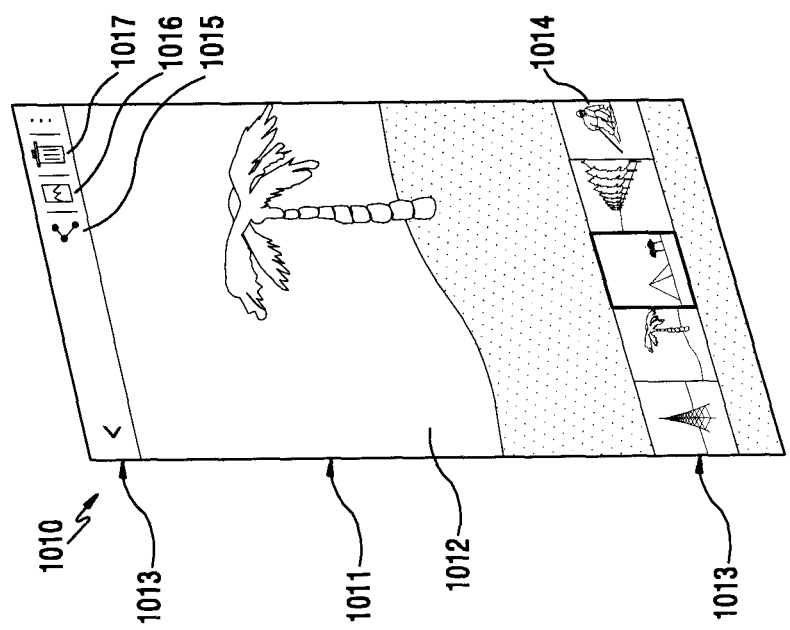
FIG. 10B is a diagram illustrating the operation of the process of FIG. 8, according to an embodiment of the present disclosure.

According to an embodiment, when the first function is a function for managing one image, the first function processor 454 may display the first function execution screen 1010 as illustrated in FIG. 10A. More particularly, the first function processor 454 may display the image 1012 on the first layer 1011. In addition, the first function processor 454 may display a content list 1014, a sharing icon 1015, an editing icon 1016, and a deleting icon 1017 on the second layer 1013. Accordingly, the display unit 420 may output the first function execution screen 1010 as illustrated in FIG. 10B.

Figure 17B:
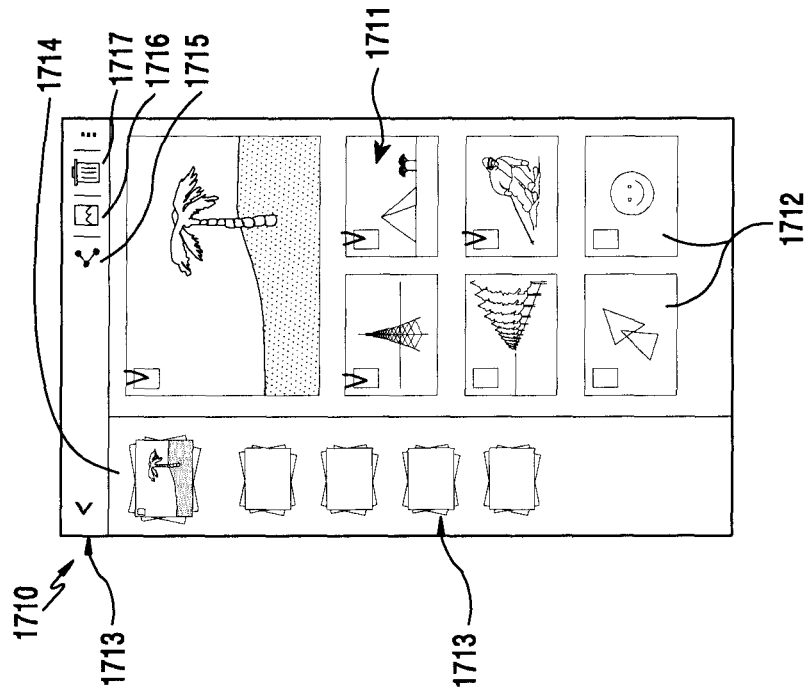
FIG. 17B is a diagram illustrating the operation of the process of FIG. 8, according to an embodiment of the present disclosure.
Figure 17A:
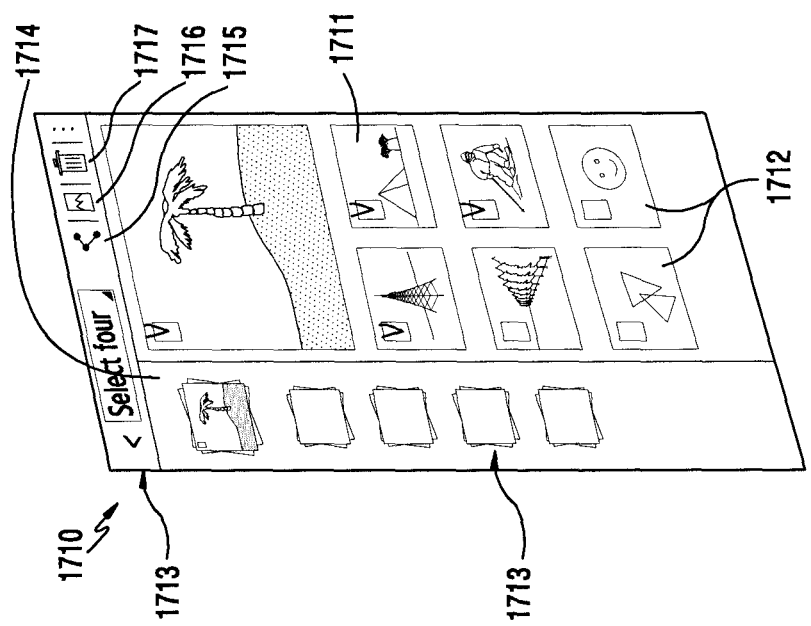
FIG. 17A is a diagram illustrating the operation of the process of FIG. 8, according to an embodiment of the present disclosure.

According to another embodiment, when the first function is a function for managing a plurality of images, the first function processor 454 may display the first function execution screen 1710 as illustrated in FIG. 17A. More particularly, the first function processor 454 may display images 1712 on the first background layer 1711. In addition, the first function processor 454 may display a group list 1714, a sharing icon 1715, an editing icon 1716, and a deleting icon 1717 on the second layer 1713. Accordingly, the display unit 420 may output the first function execution screen 1710 as illustrated in FIG. 17B.

In operation 815, the first function processor 454 may detect whether the execution of a second function is requested. More particularly, in operation 815, the first function processor 454 may detect whether a user input is received, via the input unit 430, which requests the execution of the second function.

For example, the execution of the second function may be requested by the user activating (e.g., touching) the editing icon 1016 which is displayed in the first function execution screen 1010. In response to the editing icon 1016 being activated, the first function processor 454 may receive a function request for editing one image 1012 as the second function.

According to another embodiment, at least two images may be selected from the images 1712 of the first function execution screen 1710, and the editing icon 1716 may be activated after the images are selected. In response to the activation of the icon 1716, the first function processor 454 may receive a function request for editing the images 1712 as the second function.

In operation 817, the first function processor 454 may perform one or more tasks in preparation for performing the second function. For example, the first function processor 454 may remove the second layers 1013 and 1713 from the first function execution screens 1010 and 1710, respectively. Accordingly, the display unit 420 may continuously output the first layers 1011 and 1711. The first function processor 454 may execute the first function in the background.

In operation 819, the first function processor 454 may load the second function into the second function processor 456. According to an embodiment, when the first function is a function for managing one image, the first function processor 454 may load a function for editing the image 1012, which is displayed on the first layer 1011, as the second function. According to another embodiment, when the first function is a function for managing a plurality of images, the first function processor 454 may load the function of editing the plurality of images 1712 as the second function. More particularly, the first function processor 454 may load a function for editing at least two images that are selected from the plurality of images 1712 of the first layer 1711.

In operation 821, when the second function is loaded, the screen processor 510 of the second function processor 456 may generate transparent screens 1112 and 1912 at locations of the first function execution screens 1010 and 1710. The first screen processor 510 may generate third layers 1111 and 1811 at locations of the first function execution screens 1010 and 1710 and configure the third layers 1111 and 1811 to be at least partially transparent. The third layers 1111 and 1811 may have the same size as the display unit 420. Accordingly, the display unit 420 may continuously output the first layers 1011 and 1711.

According to an embodiment, when the function for editing one image is loaded as the second function, the screen processor 510 may generate the transparent screen 1112 at the location of the first function execution screen 1010 as illustrated in FIG. 11A. To this end, the screen processor 510 may superimpose the third layer 1111 on the first layer 1011 and configure the third layer 1111 to be at least partially transparent. Doing so may permit the continuous display of the first layer 1011 on the display unit 420, as illustrated in FIG. 11B.

According to another embodiment, when the function of editing a plurality of images is loaded as the second function, the screen processor 510 may display a menu screen 1812 at the location of the first function execution screen 1710, as illustrated in FIG. 18A. The menu screen 1812 may include selectable menu items 1813 for editing the plurality of images 1712. In some implementations, the screen processor 510 may generate the third layer 1911 at the location of the first function execution screen 1710 and display the menu screen 1812 on the third layer 1911. Accordingly, the display unit 820 may output the menu screen 1812 as illustrated in FIG. 18B. When one of the selectable menu items 1813 is selected from the menu screen 1812, the screen processor 510 may generate the transparent screen 1912 at the location of the first layer 1711 as illustrated in FIG. 19A. To this end, the screen processor 510 may configure an attribute of the third layer 1811 to be at least partially transparent. Accordingly, the display unit 820 may output the first function execution screen 1710 again as illustrated in FIG. 19B.

Figure 15B:
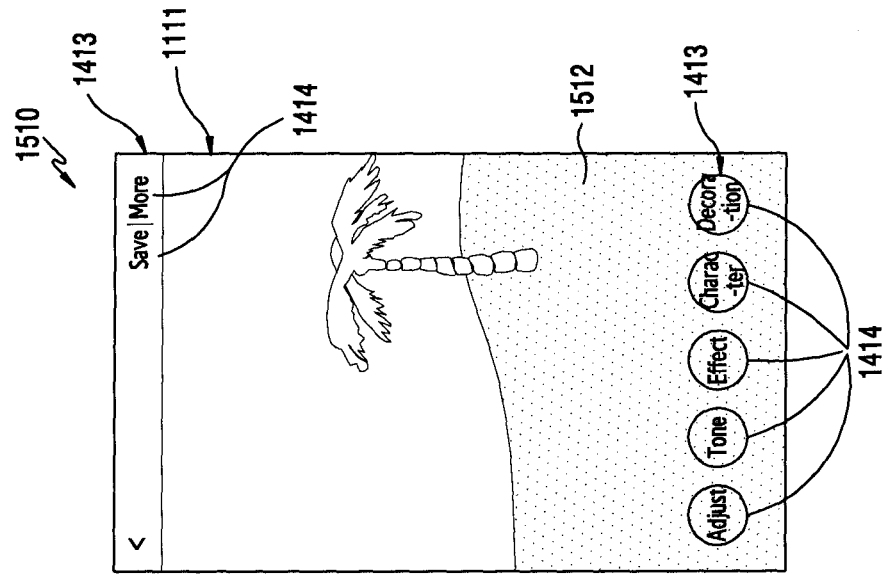
FIG. 15B is a diagram illustrating the operation of the process of FIG. 8, according to an embodiment of the present disclosure.
Figure 15A:
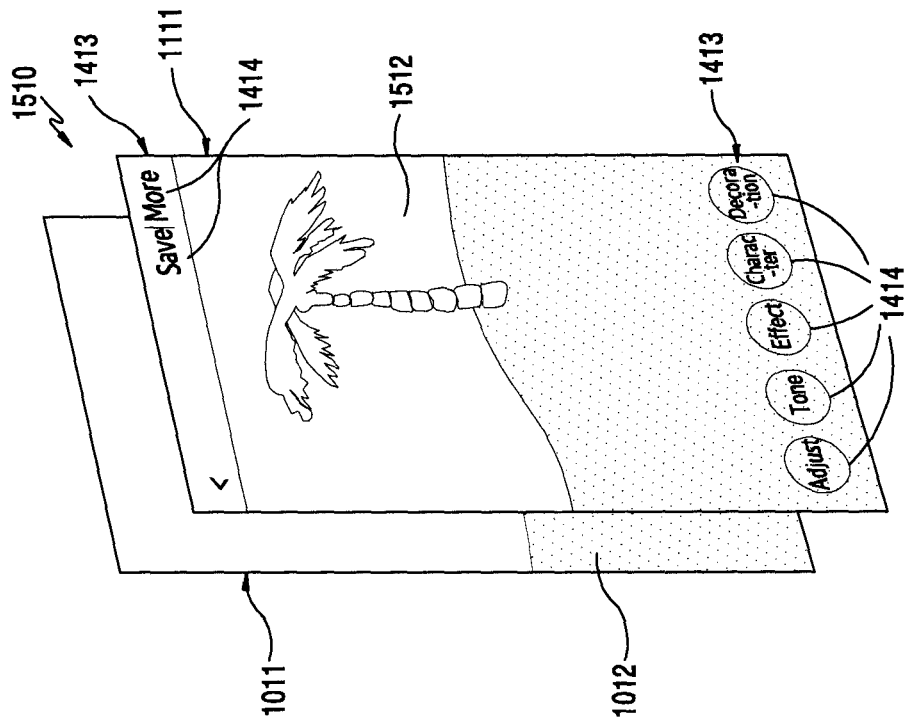
FIG. 15A is a diagram illustrating the operation of the process of FIG. 8, according to an embodiment of the present disclosure.

In operation 823, the screen processor 510 may generate second function execution screens 1510 and 2110. For example, the second function execution screens 1510 and 2110 may include the third layer 1111 and 1811, respectively. In addition, the function execution screens 1510 and 2110 may include fourth layers 1413 and 2113, respectively. After performing operation 821, the screen controller 510 may perform operation 823. Additionally or alternatively, the controller 510 may perform operations 821 and 823 concurrently. According to an embodiment, when the second function is the function of editing one image, the screen processor 510, the intermediate processor 520, and the content processor 530 of the second function processor 456 may generate the second function execution screen 1510 as illustrated in FIG. 15A. According to another embodiment, when the second function is the function of editing the plurality of images 1712, the screen processor 510, the intermediate processor 520, and the content processor 530 of the second function processor 456 may generate the second function execution screen 2110 as illustrated in FIG. 21.

Figure 9:
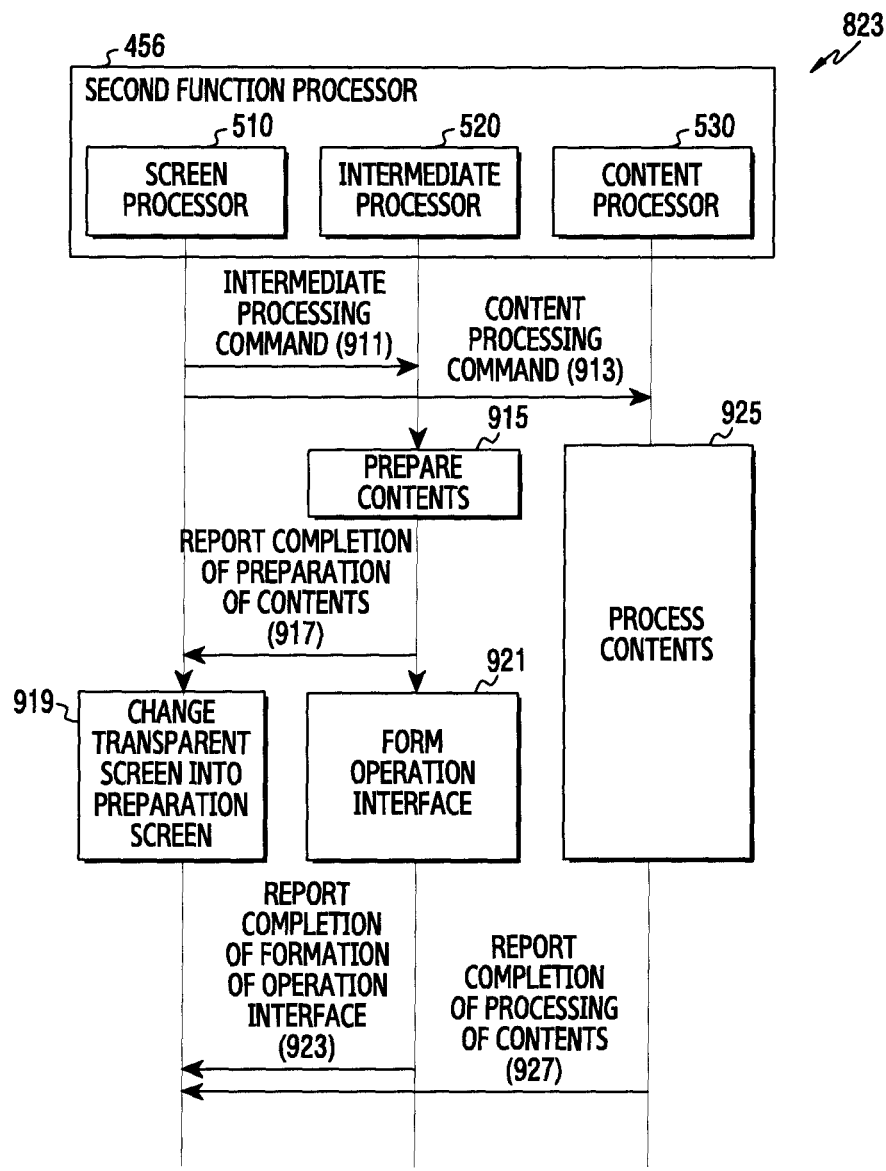
FIG. 9 is a flowchart of an example of a sub-process associated with the FIG. 8, according to an embodiment of the present disclosure.

FIG. 9 is a flowchart of an example of a process for performing operation 823, according to an embodiment of the present disclosure. According to the process, the screen processor 510 may transfer an intermediate processing command to the intermediate processor 520, in operation 911. Next, the screen processor 510 may transfer a content processing command to the content processor 530, in operation 913. The screen processor 510 may concurrently perform operations 911 and 913. In some implementations, the screen processor 510 may display the screen 1112 at the location of the first function execution screen 1010 in operation 821, and then transfer the intermediate processing command to the intermediate processor 520 in operation 911 and transfer the content processing command to the content processor 530 in operation 913. Additionally or alternatively, the screen processor 510 may display the transparent screen 1112 at the location of the first background layer 1011 in operation 821 simultaneously with transferring the intermediate processing command to the intermediate processor 520 in operation 911 and transferring the content processing command to the content processor 530 in operation 913. Additionally or alternatively, after transferring the intermediate processing command to the intermediate processor 520 in operation 911 and transferring the content processing command to the content processor 530 in operation 913, the screen processor 510 may generate transparent screen 1112 at the location of the first function execution screen 1010.

Next, when the intermediate processing command is received in operation 911, the intermediate processor 520 may prepare temporary contents, in operation 915. The intermediate processor 520 may be activated in response to the intermediate processing command. Further, the intermediate processor 520 may prepare temporary contents by processing contents associated with the second function. The contents may have a predetermined processing capacity and processing resolution. The intermediate processor 520 may prepare the temporary contents with a preset processing capacity that is smaller than the processing capacity of the contents associated with the second function. For example, the intermediate processor 520 may prepare the temporary contents with a preset processing capacity. Additionally or alternatively, the intermediate processor 520 may prepare the temporary contents to have a preset preparation resolution that is smaller than the processing resolution of the contents associated with the second function. For example, the intermediate processor 520 may prepare the temporary contents with a preset preview resolution. The intermediate processor 520 may decode the contents. For example, the intermediate processor 520 may enlarge a thumbnail of the contents. Afterwards, when the preparation of the contents is completed, the intermediate processor 520 may report the completion of the preparation of the contents to the screen processor 510 in operation 917.

When the completion of the preparation of the contents is reported in operation 917, the screen processor 510 may change the transparent screen 1112 into the preparation screen 1312 in operation 919. More particularly, the screen processor 510 may replace the transparent screen 1112 with the preparation screen 1312. The screen processor 510 may generate the preparation screen 1312 by displaying the temporary contents on the third layer 1111.

Figures 12A, 12B:
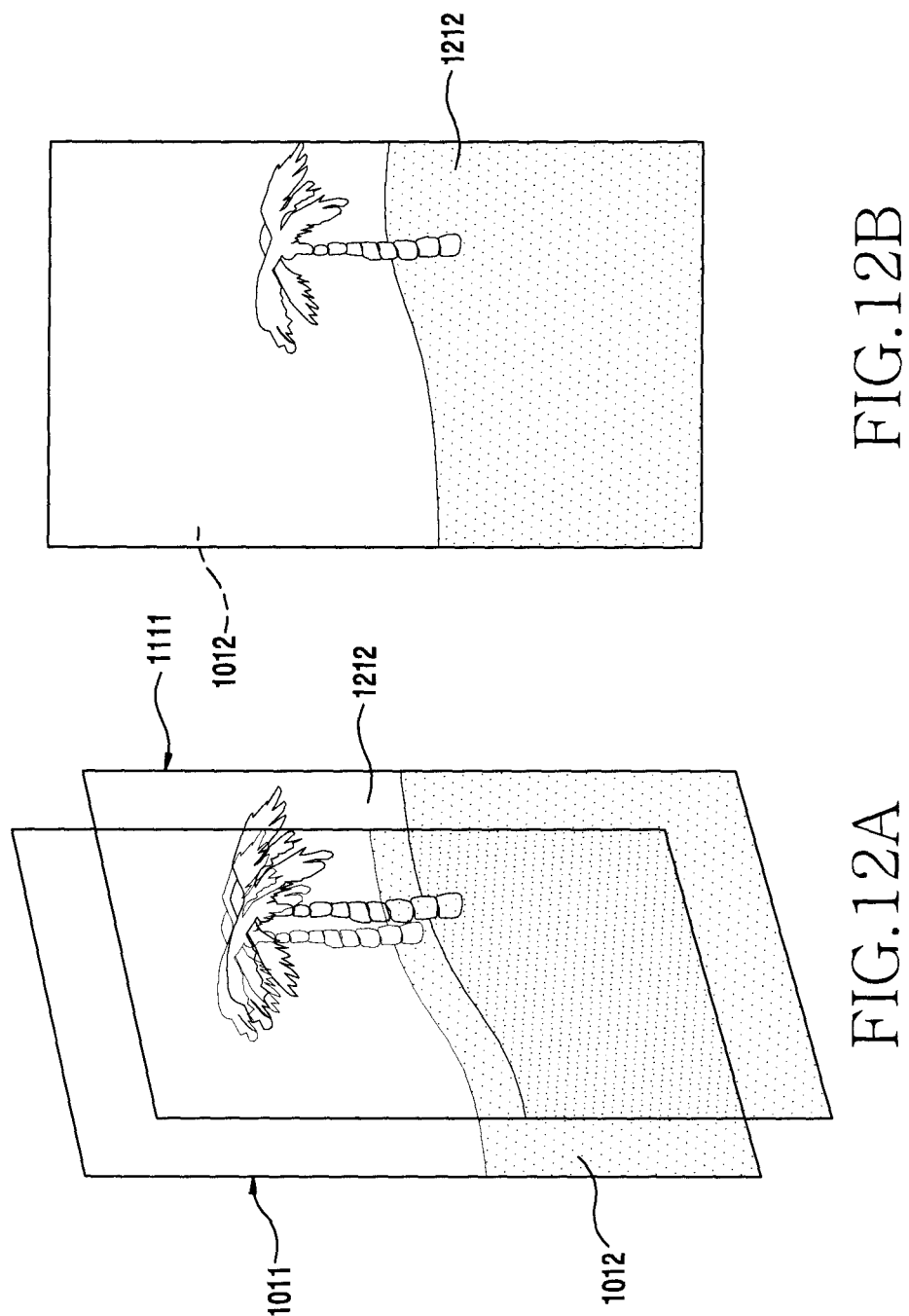
FIG. 12A is a diagram illustrating the operation of the process of FIG. 8, according to an embodiment of the present disclosure.
FIG. 12B is a diagram illustrating the operation of the process of FIG. 8, according to an embodiment of the present disclosure.

According to an embodiment, the screen processor 510 may display a partially transparent screen 1212 at the location of the first function execution screen 1010 as illustrated in FIG. 12A. To this end, the screen processor 510 may configure the third layer 1111 to be partially transparent and display the temporary contents on the third layer 1111. Accordingly, the display unit 420 may output the first function execution screen 1010 and the partially transparent screen 1212 as illustrated in FIG. 12B. Additionally or alternatively, the screen processor 510 may display the preparation screen 1312 on the third layer 1111, as illustrated in FIG. 13A. Accordingly, the display unit 420 may output the preparation screen 1312 as illustrated in FIG. 13B. Additionally or alternatively, after displaying the partially transparent screen 1212 at the location of the first function execution screen 1010 as illustrated in FIG. 12A by controlling the attributes of the third layer 1111, the screen processor 510 may display the preparation screen 1312 as illustrated in FIG. 13A. To this end, after outputting the first background layer 1011 and the partially transparent screen 1212 as illustrated in FIG. 12B, the display unit 420 may display the preparation screen 1312 as illustrated in FIG. 13B.

After reporting the completion of the preparation of the temporary contents in operation 917, the intermediate processor 520 may form an operation interface in operation 921. The intermediate processor 520 may generate one or more icons 1414. For example, the intermediate processor 520 may generate the icons 1414 for editing the contents. Further, the intermediate processor 520 may associate each icon 1414 with a respective driving engine. Accordingly, the intermediate processor 520 may associate each icon 1414 with a respective driving engine. When the formation of the operation interface is completed, the intermediate processor 520 may report the completion of the formation of the operation interface to the screen processor 510 in operation 923.

Figure 14B:
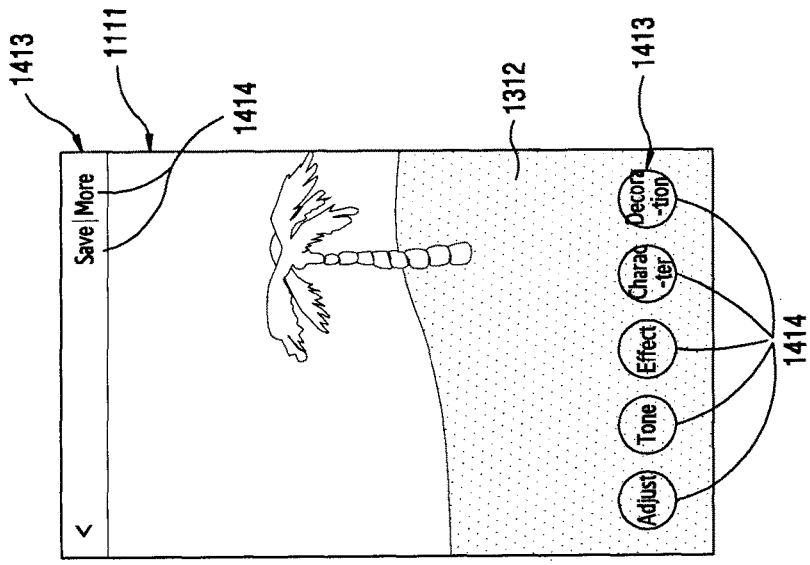
FIG. 14B is a diagram illustrating the operation of the process of FIG. 8, according to an embodiment of the present disclosure.
Figure 14A:
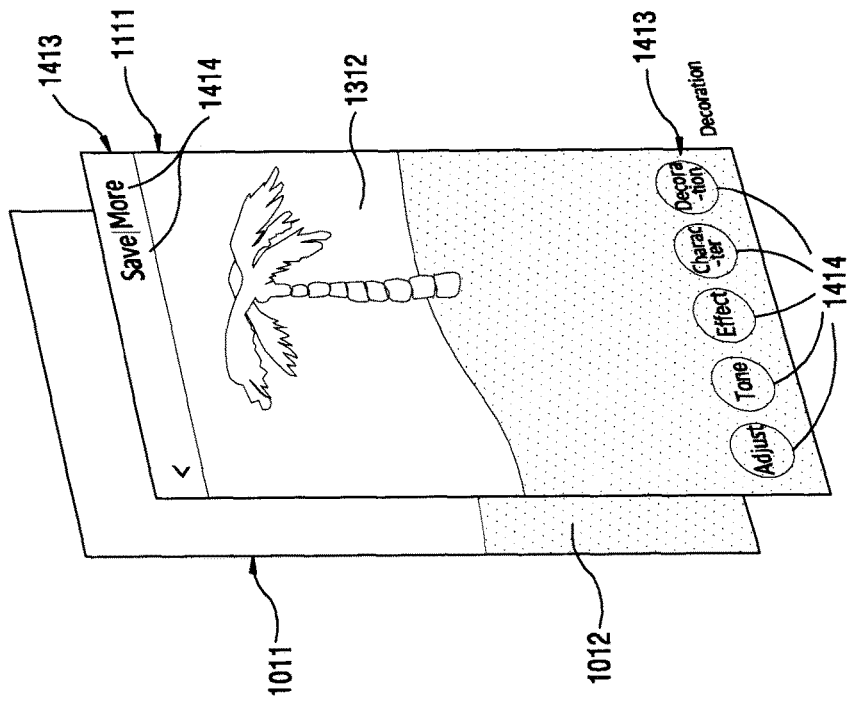
FIG. 14A is a diagram illustrating the operation of the process of FIG. 8, according to an embodiment of the present disclosure.

For example, when the completion of the formation of the operation interface is reported in operation 923, the screen processor 510 may superimpose the fourth layer 1413 on the third layer 1111 as illustrated in FIG. 14A. The screen processor 510 may overlap the fourth layer 1413 with at least some areas of the third layer 1111. The screen processor 510 may display the icons 1414 on the fourth layer 1413. Accordingly, the display unit 420 may output the preparation screen 1312 and the icons 1414 as illustrated in FIG. 14B.

When the content processing command is received in operation 913, the content processor 530 may process the contents associated with the second function in operation 925. The content processor 530 may be activated in response to the content processing command. Further, the content processor 530 may process the contents to have a specific processing capacity. The content processor 530 may process the contents to have a specific processing resolution. The content processor 530 may decode the contents. When the processing of the contents is completed, the content processor 530 may report the completion of the processing of the contents to the screen processor 510 in operation 927.

Figure 16:
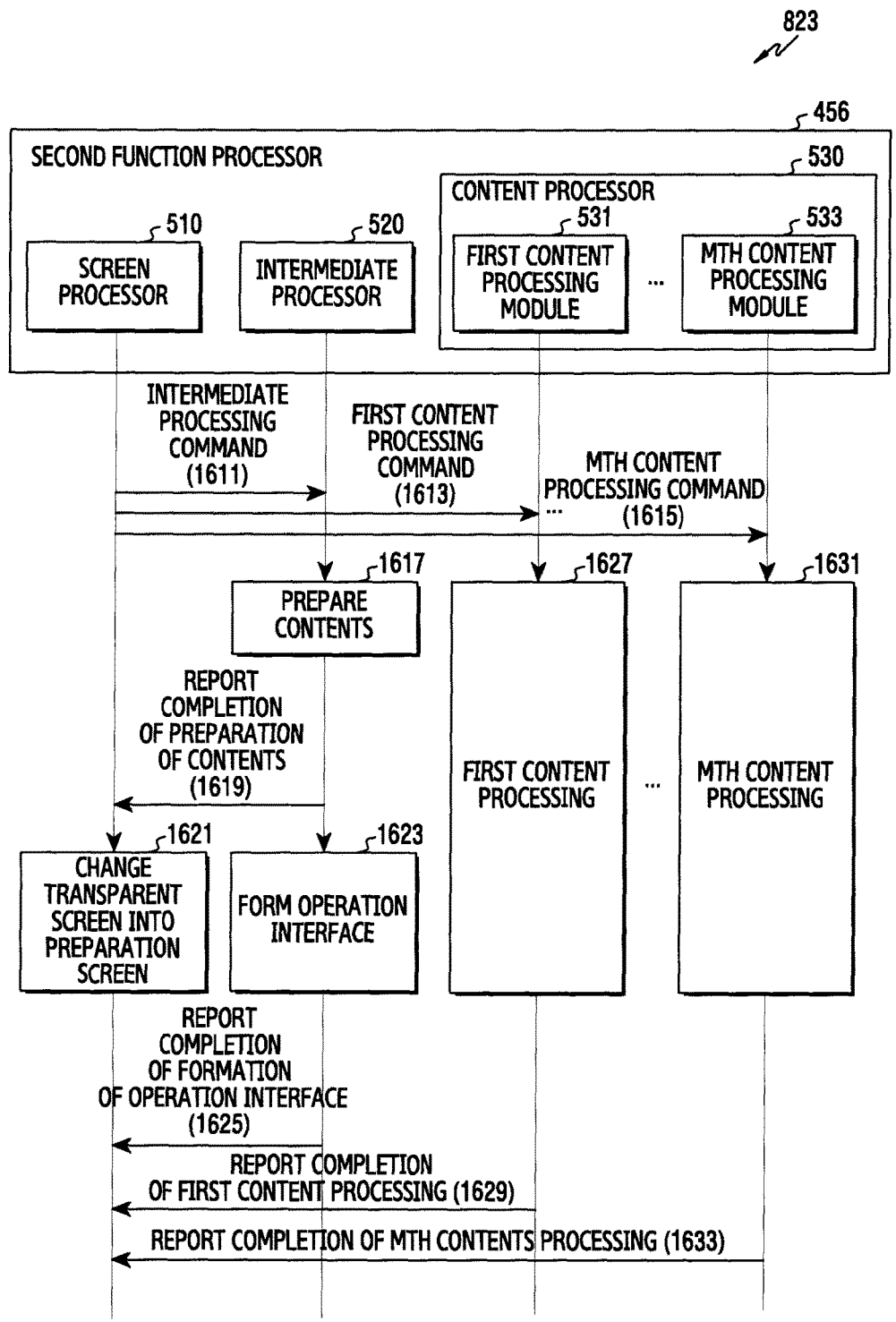
FIG. 16 is a flowchart of an example of a sub-process associated with the FIG. 8, according to an embodiment of the present disclosure.

FIG. 16 is a flowchart of an example of a process for performing operation 823, according to an embodiment of the present disclosure. As illustrated, the screen processor 510 may transfer an intermediate processing command to the intermediate processor 520 in operation 1611. Next, the screen processor 510 may transfer a content processing command to the content processor 530 in operations 1613 to 1615. The content processor 530 may include a plurality of content processing modules 531 and 533. The content processor 530 may configure the plurality of content processing modules 531 and 533 according to at least one of the content processing capacity and the content processing resolution of contents associated with the second function. For example, when the processing resolution of the contents is large, the content processor 530 may configure the plurality of content processing modules 531 and 533. Additionally or alternatively, when the processing resolution of the contents is large, the content processor 530 may configure the plurality of content processing modules 531 and 533. The content processor 530 may include a first content processing module 531 through an $M^{th}$ content processing module 533, wherein M is an integer greater than 1. Next, the screen processor 510 may transfer a first content processing command to the first content processing module 531 in operation 1613, and transfer an $M^{th}$ content processing command to the $M^{th}$ content processing module 533 in operation 1615. The screen processor 510 may allocate the contents to the first content processing module 531 to the $M^{th}$ content processing module 533. The screen processor 510 may allocate contents to the first content processing modules 531-533 according to at least one of the content processing capacity and the processing resolution of the contents. In some implementations, the screen processor 510 may perform operations 1611 to 1615 concurrently.

Next, when the intermediate processing command is received in operation 1611, the intermediate processor 520 may prepare temporary contents in operation 1617. The intermediate processor 520 may be activated in response to the intermediate processing command. Further, the intermediate processor 520 may prepare temporary contents by processing the contents. The contents may have a predetermined processing capacity and processing resolution. The intermediate processor 520 may prepare the temporary contents with a preset processing capacity smaller than the processing capacity. Additionally or alternatively, the intermediate processor 520 may prepare the temporary contents to have a preset preparation resolution smaller than the processing resolution. For example, the intermediate processor 520 may prepare the temporary contents from a plurality of images 1712. Additionally or alternatively, the intermediate processor 520 may prepare the temporary contents from a representative image corresponding to one of the images 1712. The intermediate processor 520 may decode the contents. For example, the intermediate processor 520 may enlarge a thumbnail of at least one of the images 1712. Next, when the preparation of the contents is completed, the intermediate processor 520 may report the completion of the preparation of the contents to the screen processor 510 in operation 1619.

When the completion of the preparation of the contents is reported in operation 1619, the screen processor 510 may change the transparent screen 1912 into the preparation screen 2012 in operation 1621. The screen processor 510 may replace the transparent screen 1910 with the preparation screen 2012. In some implementations, the screen processor 510 may generate the preparation screen 2012 by displaying the temporary contents on the third layer 1811.

According to an embodiment, the screen processor 510 may display the preparation screen 2012 at the location of the first function execution screen 1710 as illustrated in FIG. 20A. Accordingly, the display unit 420 may output the preparation screen 2012 as illustrated in FIG. 20B. Additionally or alternatively, although not illustrated, the screen processor 510 may display a partially transparent screen at the location of the first function execution screen 1710. To this end, the screen processor 510 may configure the third layer 1811 to be partially transparent and display the temporary contents in the third layer 1811. Accordingly, the display unit 420 may output the first layers 1711 and the partially transparent screen. Additionally or alternatively, after displaying the partially transparent screen at the location of the first function execution screen 1710, the screen processor 510 may display the preparation screen 2012. Accordingly, after outputting the first layer 1711 and the partially transparent screen, the display unit 420 may output the preparation screen 2012 as illustrated in FIG. 20B.

Next, after reporting the completion of the preparation of the temporary contents in operation 1619, the intermediate processor 520 may form the operation interface, in operation 1623. The intermediate processor 520 may generate at least one icon 2114. For example, the intermediate processor 520 may generate the icon 2114 for editing of the contents. Further, the intermediate processor 520 may associate each icon 2114 with a respective driving engine. Accordingly, the intermediate processor 520 may form an operation interface between each operation icon 2114 and one or more available driving engines. When the formation of the operation interface is completed, the intermediate processor 520 may report the completion of the formation of the operation interface to the screen processor 510 in operation 1625.

For example, when the completion of the formation of the operation interface is reported in operation 1625, the screen processor 510 may superimpose the fourth layer 2113 on the third layer 1811. For example, the screen processor 510 may overlap the fourth layer 2113 with at least some areas of the third layer 1811, and display the icons 2114 on the fourth layer 2113. Accordingly, the display unit 420 may output the preparation screen 2012 and icons 2114.

When the first content processing command is received in operation 1613, the first content processing module 531 may perform a first content processing task in operation 1627. When the $M^{th}$ content processing command is received in operation 1615, the $M^{th}$ content processing module 533 may perform an $M^{th}$ content processing task in operation 1631. The first content processing module 531 may be activated in response to the first content processing command. The $M^{th}$ content processing module 533 may be activated in response to the $M^{th}$ content processing command. Further, the first content processing module 531 to the $M^{th}$ content processing module 533 may decode the contents allocated thereto. When the contents include a plurality of images, the first content processing module 531 to the $M^{th}$ content processing module 533 may decode the images. Each of the first content processing module 531 to the $M^{th}$ content processing module 533 may decode at least one of the images. Thus, in some implementations, each of the content processing modules 531 may be allocated a different portion of the contents. The allocated portion of the contents may be associated with the content processing task performed by the portion's respective content processing module. When the performance of the first content task processing is completed, the first content processing module 531 may report the completion of the first content processing task to the screen processor 510 in operation 1629. When the performance of the first content processing task is completed, the $M^{th}$ content processing module 533 may report the completion of the $M^{th}$ content processing task to the screen processor 510 in operation 1633.

In operation 825, the screen processor 510 may display the second function execution screens 1510 and 2110 in operation 825. The screen processor 510 may change the preparation screens 1312 and 2012 into the second function execution screens 1510 and 2110. Additionally or alternatively, when the fourth layers 1413 and 2113 are superimposed on the preparation screens 1312 and 2012, the screen processor 510 may change the preparation screens 1312 and 2012 into the third layers 1111 and 1811. To this end, the screen processor 510 may display the contents on the third layers 1111 and 1811. The screen processor 510 may generate the fourth layers 1413 and 2113. Afterwards, the screen processor 510 may superimpose the fourth layer 1413 onto at least a portion of the third layer 1111. Additionally or alternatively, the screen processor 510 may superimpose at least a portion of the fourth layer, 2113 on at least a portion of the third layer 1811. The screen processor 510 may display the icons 1414 and 2114 on the fourth layers 1413 and 2113, respectively.

Figure 21B:
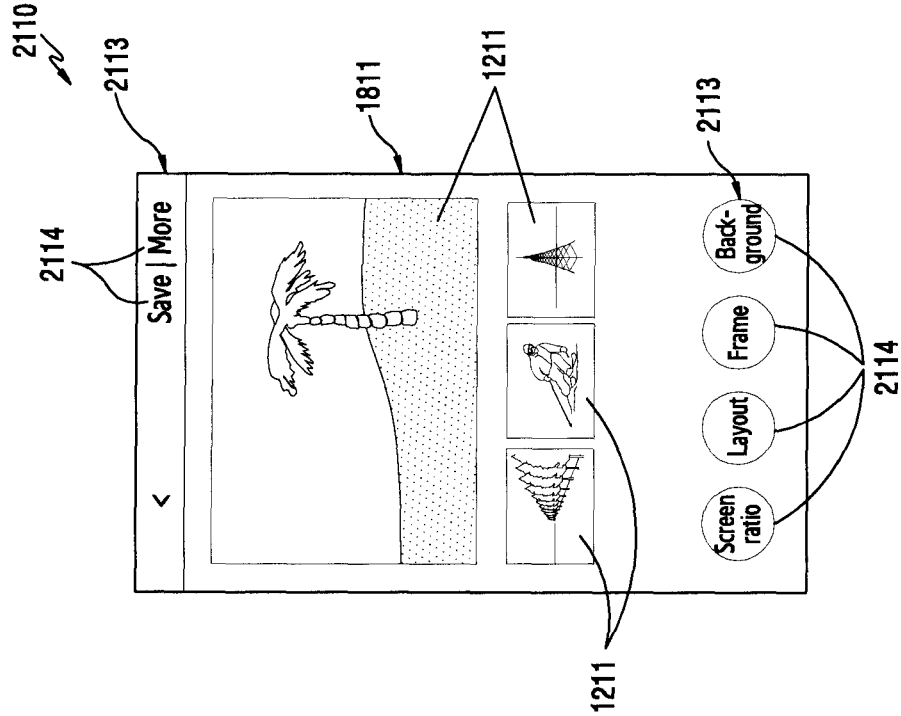
FIG. 21B is a diagram illustrating the operation of the process of FIG. 8, according to an embodiment of the present disclosure.
Figure 21A:
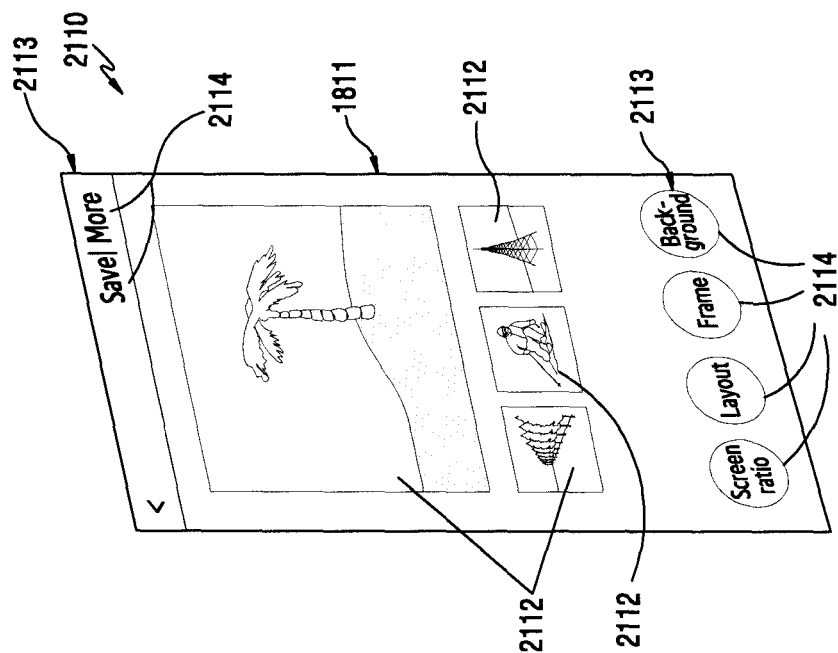
FIG. 21A is a diagram illustrating the operation of the process of FIG. 8, according to an embodiment of the present disclosure.

According to an embodiment, the screen processor 510 may display the second function execution screen 1510 as illustrated in FIG. 15A. Accordingly, the display unit 420 may output the second function execution screen 1510 as illustrated in FIG. 15B. According to another embodiment, the screen processor 510 may display the second function execution screen 2110 as illustrated in FIG. 21A. Accordingly, the display unit 420 may output the second function execution screen 2110 as illustrated in FIG. 21B.

In operation 827, the screen controller 510 may execute the second function. The second function processor 456 may execute the second function in the foreground.

The electronic device 400 according to various embodiments may include the display unit 420, the first function processor 454 for executing the first function to the first function execution screens 1010 and 1710 for the first function on the display unit 420, and loading the second function, and the second function processor 456 for executing the second function to display the second function execution screens 1510 and 2110 for the second function on the display unit 420, wherein the second function processor 456 may generate the layers 1111 and 1811 at the locations of the first function execution screens 1010 and 1710 and generate the second function execution screens 1510 and 2110 to display the second function execution screens 1510 and 2110 on the layers 1111 and 1811. The layers 1111 and 1811 may be at least partially transparent.

In the electronic device 400 according to various embodiments, the second function processor 456 may include the content processor 530 for processing contents and the screen processor 510 for displaying contents on the layers 1111 and 1811.

In the electronic device 400 according to various embodiments, the contents may be associated with a predetermined processing capacity and processing resolution.

In the electronic device 400 according to various embodiments, the second function processor 456 may further include the intermediate processor 520 for processing the contents to have a processing capacity smaller than the processing capacity and a preparation resolution smaller than the processing resolution to prepare temporary contents, and the screen processor 510 may display the temporary contents on the layers 1111 and 1811.

In the electronic device 400 according to various embodiments, the contents processor 530 and the intermediate processor 520 may be executed in parallel.

In the electronic device 400 according to various embodiments, when the processing of the contents is completed, the screen processor 510 may remove the temporary contents and display the contents on the layers 1111 and 1811.

In the electronic device 400 according to various embodiments, the intermediate processor 520 may form an operation interface that is associated with the second function.

In the electronic device 400 according to various embodiments, the intermediate processor 520 may generate one or more icons 1414 and 2114.

In the electronic device 400 according to various embodiments, the screen processor 510 may display the icons 1414 and 2114 on the layers 1111 and 1811, respectively. Additionally or alternatively, the screen processor 510 may display the icons 1414 and 2114 on the layers 1413 and 2113, respectively, which are superimposed on the layers 1111 and 1811.

In the electronic device 400 according to various embodiments, the first function execution screens 1010 and 1710 may include the first layers 1011 and 1711 and the second layers 1013 and 1713 that are superimposed on the first layers 1011 and 1711, and the first function processor 454 may remove the second layers 1013 and 1713 from the first layers 1011 and 1711 and load the second function into the second function processor 456.

The method of displaying the screen by the electronic device 400 according to various embodiments may include an operation for displaying first function execution screen 1010 and 1710 for the first function, an operation for loading the second function, an operation for generating layers 1111 and 1811 at locations of the first function execution screens 1010 and 1710, an operation for generating the second function execution screens 1510 and 2110 for the second function, and an operation for displaying the second function execution screens 1510 and 210 on the layers 1111 and 1811. The layers 1111 and 1811 may be at least partially transparent.

In the method of displaying the screen according to various embodiments, the operation for generating the second function execution screens 1510 and 2110 may include an operation for processing contents and the operation for displaying the second function execution screens 1510 and 2110 may include an operation for displaying the contents on the layers 1111 and 1811.

In the method of displaying the screen according to various embodiments, the contents may have a predetermined processing capacity and processing resolution.

In the method of displaying the screen according to various embodiments, the operation for generating the second function execution screens 1510 and 2110 may further include an operation for preparing temporary contents by processing the contents to have a processing capacity smaller than the processing capacity and a preparation resolution smaller than the processing resolution and an operation for displaying the temporary contents on the layers 1111 and 1181.

In the method of displaying the screen according to various embodiments, the operation for processing the contents and the operation for preparing the temporary contents may be performed concurrently.

In the method of displaying the screen according to various embodiments, when the processing of the contents is completed, the operation for displaying the contents may include an operation for removing the temporary contents from the layers 1111 and 1811 and an operation for displaying the contents on the layers 1111 and 1811.

In the method of displaying the screen according to various embodiments, the operation for generating the second function execution screens 1510 and 2110 may further include an operation for forming the operation interface for the operation of the second function.

In the method of displaying the screen according to various embodiments, the operation for forming the operation interface may include an operation for generating one or more icons 1414 and 2114.

In the method of displaying the screen according to various embodiments, the operation for generating the second function execution screens 1510 and 2110 or the operation for displaying the second function execution screens 1510 and 2110 may further include an operation for displaying the icons 1414 and 2114 on the layers 1111 and 1811 or other layers 1413 and 2113 that are superimposed on the layers 1111 and 1811.

In the method of displaying the screen according to various embodiments, the first function execution screens 1010 and 1710 may include the first layers 1011 and 1711 and the second layers 1013 and 1713 that are superimposed on the first layers 1011 and 1711, and the operation for loading the second function may include an operation for removing the second layers 1013 and 1713 from the first layers 1011 and 1711 and an operation for loading the second function.

The term "module" used in the various exemplary embodiments of the present disclosure refers to a unit including one of hardware, software, and firmware, or a combination of two or more of them, for example. For example, the "module" may be used interchangeably with terms like unit, logic, logical block, component or circuit. The "module" may be a minimum unit of an integrally configured part or a part of it. The "module" may be a minimum unit that performs one or more functions or a part of it. The "module" may be implemented mechanically or electronically. For example, the "module" may include at least one of an Application Specific Integrated Circuit (ASIC) chip, Field Programmable Gate Arrays (FPGAs), and a programmable logic device which perform any operation that is already well known or will be developed in the future.

FIGS. 1-21B are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, the exemplary embodiments set forth in this document are suggested to explain and understand features disclosed therein, and do not limit the scope of the technical features set forth in this document. Therefore, the scope of this document should be construed as including all changes based on the technical idea of this document or other various exemplary embodiments.

What is claimed is:
1. A method of an electronic device, the method comprising:
    displaying a first image corresponding to a multimedia content in a user interface of a first application;

receiving an input for executing a second application, distinct from the first application, in the user interface of the first application;

in response to the receiving the input, executing the second application, decoding at least part of the multimedia content to generate a second image, and displaying a temporary image that is distinct from the second image to be generated, wherein the temporary image is decoded from the multimedia content and a resolution of the temporary image is lower than a resolution of the first image; and in response to identifying that the decoding of at least the part of the multimedia content is completed, displaying, by the second application, the second image corresponding to the multimedia content instead of the temporary image and an object for executing a function provided by the second application in a user interface of the second application.

2. The method of claim 1, wherein displaying the temporary image comprises:

in response to receiving the input for executing the second application, generating, by decoding the at least part of the multimedia content, the temporary image as low resolution of the first image, and displaying the temporary image.

3. The method of claim 1, wherein displaying the temporary image comprises displaying the temporary image in an upper display layer than a display layer in which the first image is displayed.

4. The method of claim 3, further comprising:

removing the display layer in which the first image is displayed after the temporary image is displayed.

5. The method of claim 3, wherein the upper display layer comprises a transparent layer.

6. The method of claim 1, wherein the first application comprises an application for displaying a list of the multimedia content, and wherein the second application comprises an application for editing the multimedia content.

7. The method of claim 6, wherein the object for executing the function provided by the second application comprises one or more icons for editing the multimedia content.

8. The method of claim 1, wherein the object for executing the function provided by the second application is displayed in another layer that is superimposed on a display layer in which the second image is displayed.

9. The method of claim 1, wherein the decoding the at least part of the multimedia content to generate the second image comprises decoding the at least part of the multimedia content to generate the second image as a high resolution.

10. An electronic device comprising:

a display; and a processor, configured to:

display a first image corresponding to a multimedia content in a user interface of a first application, receive an input for executing a second application, distinct from the first application, in the user interface of the first application, in response to the receiving the input, executing the second application, decoding at least part of the multimedia content to generate a second image, and display a temporary image that is distinct from the second image to be generated, wherein the temporary image is decoded from the multimedia content and a resolution of the temporary image is lower than a resolution of the first image, and in response to identifying that the decoding of at least the part of the multimedia content is completed, display, by the second application, the second image corresponding to the multimedia content instead of the temporary image and an object for executing a function provided by the second application in a user interface of the second application.

11. The electronic device of claim 10, wherein the processor is configured to:

in response to receiving the input for executing the second application, generate, by decoding the at least part of the multimedia content, the temporary image as low resolution of the first image, and display the temporary image.

12. The electronic device of claim 10, wherein the processor is configured to display the temporary image in an upper display layer different than a display layer in which the first image is displayed.

13. The electronic device of claim 12, wherein the processor is further configured to remove the display layer in which the first image is displayed after the temporary image is displayed.

14. The electronic device of claim 12, wherein the upper display layer comprises a transparent layer.

15. The electronic device of claim 10, wherein the first application comprises an application for displaying a list of the multimedia content, and wherein the second application comprises an application for editing the multimedia content.

16. The electronic device of claim 15, wherein the object for executing the function provided by the second application comprises one or more icons for editing the multimedia content.

17. The electronic device of claim 10, wherein object for executing the function provided by the second application is displayed in another display layer that is superimposed on a display layer in which the second image is displayed.

18. The electronic device of claim 10, wherein the processor is configured to decode the at least part of the multimedia content to generate the second image as a high resolution.

* * * * *